(12) United States Patent
Akdemir et al.

(10) Patent No.: US 11,908,151 B2
(45) Date of Patent: Feb. 20, 2024

(54) SYSTEM AND METHOD FOR MOBILE 3D SCANNING AND MEASUREMENT

(71) Applicant: Xesto Inc., Toronto (CA)

(72) Inventors: Mehmet Afiny Affan Akdemir, Toronto (CA); Christian Garcia Salguero, Toronto (CA); Victoria Sophie Howe, Toronto (CA)

(73) Assignee: Xesto Inc. (CA)

( * ) Notice: Subject to any disclaimer, the term of this patent is extended or adjusted under 35 U.S.C. 154(b) by 0 days.

(21) Appl. No.: 18/187,730

(22) Filed: Mar. 22, 2023

(65) Prior Publication Data
US 2023/0230271 A1 Jul. 20, 2023

Related U.S. Application Data

(62) Division of application No. 16/934,007, filed on Jul. 21, 2020, now Pat. No. 11,657,528.

(60) Provisional application No. 62/941,779, filed on Nov. 28, 2019.

(51) Int. Cl.
*G06T 7/593* (2017.01)
*G06T 7/33* (2017.01)
*G06T 19/00* (2011.01)

(52) U.S. Cl.
CPC ........... *G06T 7/593* (2017.01); *G06T 7/33* (2017.01); *G06T 19/00* (2013.01); *G06T 2207/20036* (2013.01); *G06T 2207/20084* (2013.01)

(58) Field of Classification Search
CPC ........... G06T 7/593; G06T 7/33; G06T 19/00; G06T 2207/20036; G06T 2207/20084; G06T 7/579; G06T 2207/10028; G06T 2207/20081; G06T 17/00
See application file for complete search history.

(56) References Cited

U.S. PATENT DOCUMENTS

| 2004/0001620 A1* | 1/2004 | Moore | G06V 10/757 |
| | | | 382/154 |
| 2018/0130224 A1 | 5/2018 | Hoelscher et al. | |
| 2018/0130255 A1 | 5/2018 | Hazeghi et al. | |
| 2020/0029490 A1 | 1/2020 | Bertucci et al. | |

(Continued)

OTHER PUBLICATIONS

V. Jain and H. Zhang, "Robust 2D shape correspondence using geodesic shape context", Proc. of Pacific Graphics, pp. 121-124, 2005. (Year: 2005).*

(Continued)

*Primary Examiner* — Said Broome
*Assistant Examiner* — Andrew Shin
(74) *Attorney, Agent, or Firm* — Foley & Lardner LLP

(57) ABSTRACT

Systems and methods are provided for three-dimensional scanning and measurement by a device having a processor. The processor is configured to receive images of an object from at least two angles; preprocess the images using morphological refinement; create a source point cloud based on the images; remove outliers from the source point cloud; globally register the source point cloud to generate a transformed source point cloud; compare the transformed source point cloud with a target point cloud to generate a stitched point cloud that thereby creates a stitched 3D model; measure the resulting stitched 3D model; and provide the resulting stitched 3D model for comparison to a digitized item to assess sizing of the 3D model to the item.

24 Claims, 12 Drawing Sheets

(56) References Cited

U.S. PATENT DOCUMENTS

2020/0211293 A1 7/2020 Kim et al.
2021/0350147 A1 11/2021 Yuan et al.

OTHER PUBLICATIONS

Sorkine, Olga, and Alexa, Marc, "As-Rigid-As-Possible Surface Modeling" In Proc, SGP, (2007), pp. 109-116.
Toponogov, Victor Andreevich, Different Geometry of Curves and Surfaces, Boston MA: Birkhauser Boston, Inc. (2006) p. 132.
U.S. Notice of Allowance on US dated Feb. 17, 2023.

\* cited by examiner

410

410  420

SYSTEM AND METHOD FOR MOBILE 3D SCANNING AND MEASUREMENT

CROSS-REFERENCE TO RELATED PATENT APPLICATIONS

This application claims the benefit of priority under 35 U.S.C. §§ 120 and 121 as a divisional of U.S. patent application Ser. No. 16/934,007, filed Jul. 21, 2020, which claims the benefit of priority under 35 U.S.C. § 119 of U.S. Provisional Patent Application. No. 62/941,779 filed on Nov. 28, 2019, each of which is hereby incorporated by reference herein in its entirety.

FIELD

Various examples are described herein that generally relate to a mobile three-dimensional (3D) scanning and measurement device, as well as systems and methods for recommending sizing based thereon.

BACKGROUND

The following paragraphs are provided by way of background to the present disclosure. They are not, however, an admission that anything discussed therein is prior art or part of the knowledge of persons skilled in the art.

3D scanning and measurement can be applied to any body part and to any other object that requires sizing. Some examples include a wrist, chest or breasts, and feet.

Methods of measuring feet or other body parts using mechanical measuring devices have been developed over time, from the Brannock device to currently available electronic measuring instruments that employ contact sensors. In addition to mechanical measuring devices, advances in electrical and optical devices have made it possible to have non-contact measurement devices. Non-contact measurement can be performed using such techniques as structured light vision, stereoscopic vision, and laser measurement.

In the structured light vision system, the measurement is based on the principle of optical triangulation. The basic principle is that a structured light projector projects a controllable light: spot or light bar onto the surface of the object to be measured. A camera obtains an image, and the three-dimensional coordinates of the object are calculated using trigonometry. The disadvantages of structured light vision include: (a) measurement accuracy limited by physical optics; (b) object occlusion; and (c) the inverse relationship between measurement accuracy and speed.

In the stereoscopic vision system, two cameras with a relatively fixed position are used to acquire two images of the same scene from different angles at two different positions, by calculating the spatial points in the two images. Parallax is used to obtain the three-dimensional coordinate values. The disadvantages of stereoscopic vision include: (a) large amounts of data processing; (b) long processing times; (c) the necessity of matching two images; and (d) reduced matching and measurement accuracy when the surface gray level and surface shape change by a small amount.

In the laser measurement system, a visible laser beam is positioned by a polygonal lens, and the laser beam scans and measures the surface of the object using high-frequency scanning. The laser beam is reflected by the surface of the object and then received by the laser receiver. The system can then calculate the coordinates of the surface of the object. The disadvantages of the laser measurement system include: (a) high costs; and (b) the inverse relationship between accuracy and the scanning rate.

After acquiring a set of 3D scans of the same object from multiple point clouds for the purpose of 3D measurement, often the required measurement on the object spans across different scans that are partially overlapping. It is possible to combine the multiple 3D scans through finding a rigid transformation between each scan. This can be performed using the iterative closest point algorithm (ICP), which is a method of estimating the optimal alignment between two 3D objects. The disadvantages of ICP include (a) the susceptibility of ICP to become stuck in local minima, which corresponds to an incorrect alignment; and (b) movement of the object in between the scans deforming the intermediate object to the point where no rigid transformation can be found. This is relevant in the context of body part scans, as users of the scanning system do not stand motionless in between scans.

Consequently, there is a need for a system and device for 3D scanning and measurement and use thereof that address the challenges and/or shortcomings and disadvantages described above.

SUMMARY OF VARIOUS EXAMPLE EMBODIMENTS

Various embodiments of a device for mobile 3D scanning and measurement, system and methods of use thereof, and computer-implemented products for use therewith, are provided according to the teachings herein.

According to one aspect of the invention, there is disclosed a computer-implemented method for three-dimensional scanning and measurement comprising: receiving a plurality of images of an object, the plurality of images providing views of an object from at least two angles; preprocessing the plurality of images using morphological refinement; creating a source point cloud based at least in part on the plurality of images; removing outliers from the source point cloud; globally registering the source point cloud, thereby creating a globally registered source point cloud; generating a transformed source point cloud based at least in part on the globally registered source point cloud; comparing the transformed source point cloud with a target point cloud, thereby creating a point cloud comparison; generating a stitched point cloud based at least in part on the point cloud comparison, thereby creating a resulting stitched 3D model; measuring the resulting stitched 3D model; and outputting the resulting stitched 3D model in a format capable of being displayed.

In at least one example embodiment, the method further comprises inputting the source point cloud into a neural network configured for parameter optimization based at least in part on one of a significant amount of overlap between the stitched point cloud or labeled correspondences.

In at least one example embodiment, the morphological refinement causes morphological changes by at least one of an erosion of points in a 3D model, noise removal, or edge refinement.

In at least one example embodiment, the 3D model is a 3D point cloud.

In at least one example embodiment, the morphological refinement is based at least in part on at least one of filtering masks or kernels.

In at least one example embodiment, the method further comprises inputting the source point cloud into a neural network, the source point cloud having a surface with a discontinuity on the surface and a radius for each point around the discontinuity, the neural network configured to output an optimal radius for each point around the discontinuity that corresponds to areas to be removed from the source point cloud.

In at least one example embodiment, creating the source point cloud is based at least in part on creating a geometrical representation of the plurality of images using spatial information.

In at least one example embodiment, the spatial information is based at least in part on camera intrinsics of a camera that scanned the plurality of images.

In at least one example embodiment, removing outliers comprises 2D or 3D processing that accentuates areas of interest of the object.

In at least one example embodiment, globally registering the source point cloud comprises aligning 3D assets using geometrically relevant features, and generating a transformed source asset from the aligned 3D assets.

In at least one example embodiment, comparing the transformed source point cloud with a target point cloud comprises iterative closest point (ICP) stitching to generate the stitched point cloud.

In at least one example embodiment, the ICP stitching comprises an overlap step.

In at least one example embodiment, measuring the resulting stitched 3D model comprises using a distance function.

In another aspect, there is provided a computer-implemented method for deformable object stitching comprising: receiving a first point cloud and a second point cloud having a partial overlap; finding first prominent features in a subregion $G_1$ and a subregion $G_2$ in a first region of the partial overlap over the first point cloud; computing first geodesics based on the first prominent features; finding second prominent features in a subregion $H_1$ and a subregion $H_2$ in a second region of the partial overlap over the second point cloud; computing second geodesics based on the second prominent features; building a first correspondence between the subregion $G_1$ and the subregion $H_1$; building a second correspondence between the subregion $G_2$ and the subregion $H_2$; deforming the first geodesics and the second geodesics based on the first correspondence and the second correspondence; stitching the first point cloud and the second point cloud using iterative closest point (ICP) stitching, thereby generating a stitched point cloud; calculating a required deformation to transform the first geodesics to the second geodesics; and applying the required deformation to the second point cloud to match the second point cloud to the first point cloud, thereby refining the stitched point cloud; and providing the refined stitched point cloud in a format capable of being displayed.

In at least one example embodiment, finding first prominent features comprises estimating a curvature in subregion $G_1$ or subregion $G_2$, then refining the estimated curvature by iteratively calculating the curvature over one or more iterations, such that a region of high curvature is re-calculated by considering a smaller neighborhood in the region, and calculating the curvature based on the smaller neighborhood, repeating the iterations until sampling in a smaller neighborhood does not increase the curvature in the region by more than a specified threshold.

In at least one example embodiment, finding second prominent features comprises estimating a curvature in subregion $H_1$ or subregion $H_2$, then refining the estimated curvature by iteratively calculating the curvature over one or more iterations, such that a region of high curvature is re-calculated by considering a smaller neighborhood in the region, and calculating the curvature based on the smaller neighborhood, repeating the iterations until sampling in a smaller neighborhood does not increase the curvature in the region by more than a specified threshold.

In at least one example embodiment, finding the first prominent features comprises approximating a curvature on subregion $G_1$ and subregion $G_2$, by discretizing a curvature operator, and extracting the first prominent features with respect to the curvature where the curvature is high or zero, a high curvature representing sharp corners and a zero curvature representing a flat region.

In at least one example embodiment, finding the second prominent features comprises approximating a curvature on subregion $H_1$ and subregion $H_2$ by discretizing a curvature operator, and extracting the second prominent features with respect to the curvature where the curvature is high or zero, a high curvature representing sharp corners and a zero curvature representing a flat region.

In at least one example embodiment, computing the first geodesics and computing the second geodesics comprises triangulating on respective subregions and determining a shortest path between two points on a triangulated surface.

In at least one example embodiment, building the first correspondence and building the second correspondence comprises ranking the first prominent features and the second prominent features, respectively, by curvature in the first point cloud and the second point cloud, respectively, and matching points therebetween.

In at least one example embodiment, calculating the required deformation comprises producing a surface determined by connecting any two points between subregion $G_1$ and subregion $H_1$, producing a geodesic, and extending the geodesic into a surface by considering a small neighborhood about the geodesic.

In at least one example embodiment; calculating the required deformation further comprises estimating a first fundamental form of the surface by finite difference methods, and deforming the surface by an As Rigid As Possible (ARAP) deformation using the first correspondence and the second correspondence.

In at least one example embodiment, calculating the required deformation further comprises determining a similarity between deformed subregions by estimating a second fundamental form for each of the subregions, and comparing a coefficient between the first fundamental form and the second fundamental form.

In another aspect, there is provided a system and computer-implemented method for fitting a first 3D model of an item over a second 3D model of an object comprising: receiving a model point cloud of the item and an object point cloud of the object; aligning the object point cloud inside the model point cloud; extracting a surface heat map based at least in part on an interaction of the object point cloud with the model point cloud, the surface heat map having highest heat values; determining a corresponding region on the model point cloud based at least in part on the highest heat values; determining an elasticity of the corresponding region based at least in part on material properties of the item; and displaying an enhanced surface heat map based at least in part on the surface heat map and the elasticity of the corresponding region.

In at least one example embodiment, determining the elasticity of the corresponding region is based at least in part on a predetermined set of weights, where each element in the set corresponds to the elasticity of a particular physical material of the object.

In another aspect, there is provided a system for providing three-dimensional scanning and measurement comprising a data store and at least one processor coupled to the data store, the data store comprising a non-transient computer-readable storage medium having stored thereon computer-executable instructions for execution by the processor to perform the method for providing three-dimensional scanning and measurement.

In another aspect, there is provided a system for deformable object stitching comprising a data store and at least one processor coupled to the data store, the data store comprising a non-transient computer-readable storage medium having stored thereon computer-executable instructions for execution by the processor to perform the method for deformable object stitching.

In another aspect, there is provided a system for fitting a first 3D model of an item over a second 3D model of an object comprising a data store and at least one processor coupled to the data store, the data store comprising a non-transient computer-readable storage medium having stored thereon computer-executable instructions for execution by the processor to perform the method for fitting a first 3D model of an item over a second 3D model.

In another aspect, there is provided a computer-readable medium comprising a plurality of instructions that are executable on a processor of a system for adapting the system to implement the method for providing three-dimensional scanning and measurement.

In another aspect, there is provided a computer-readable medium comprising a plurality of instructions that are executable on a processor of a system for adapting the system to implement the method for deformable object stitching.

In another aspect, there is provided a computer-readable medium comprising a plurality of instructions that are executable on a processor of a system for adapting the system to implement the method for fitting a first 3D model of an item over a second 3D model of an object.

Other features and advantages of the present application will become apparent to persons skilled in the art from the following detailed description taken together with the accompanying drawing. It should be understood, however, that the detailed description and the specific examples, while indicating preferred example embodiments of the application, are given by way of illustration only, since various changes and modifications within the spirit and scope of the application will become apparent to persons skilled in the art from this detailed description.

BRIEF DESCRIPTION OF THE DRAWINGS

For a better understanding of the various example embodiments described herein, and to show more clearly how these various embodiments may be carried into effect, reference will be made, by way of example, to the accompanying drawing figures which show at least one example embodiment, and which are to be described. The drawing figures are not intended to limit the scope of the teachings described herein.

Figure 1:
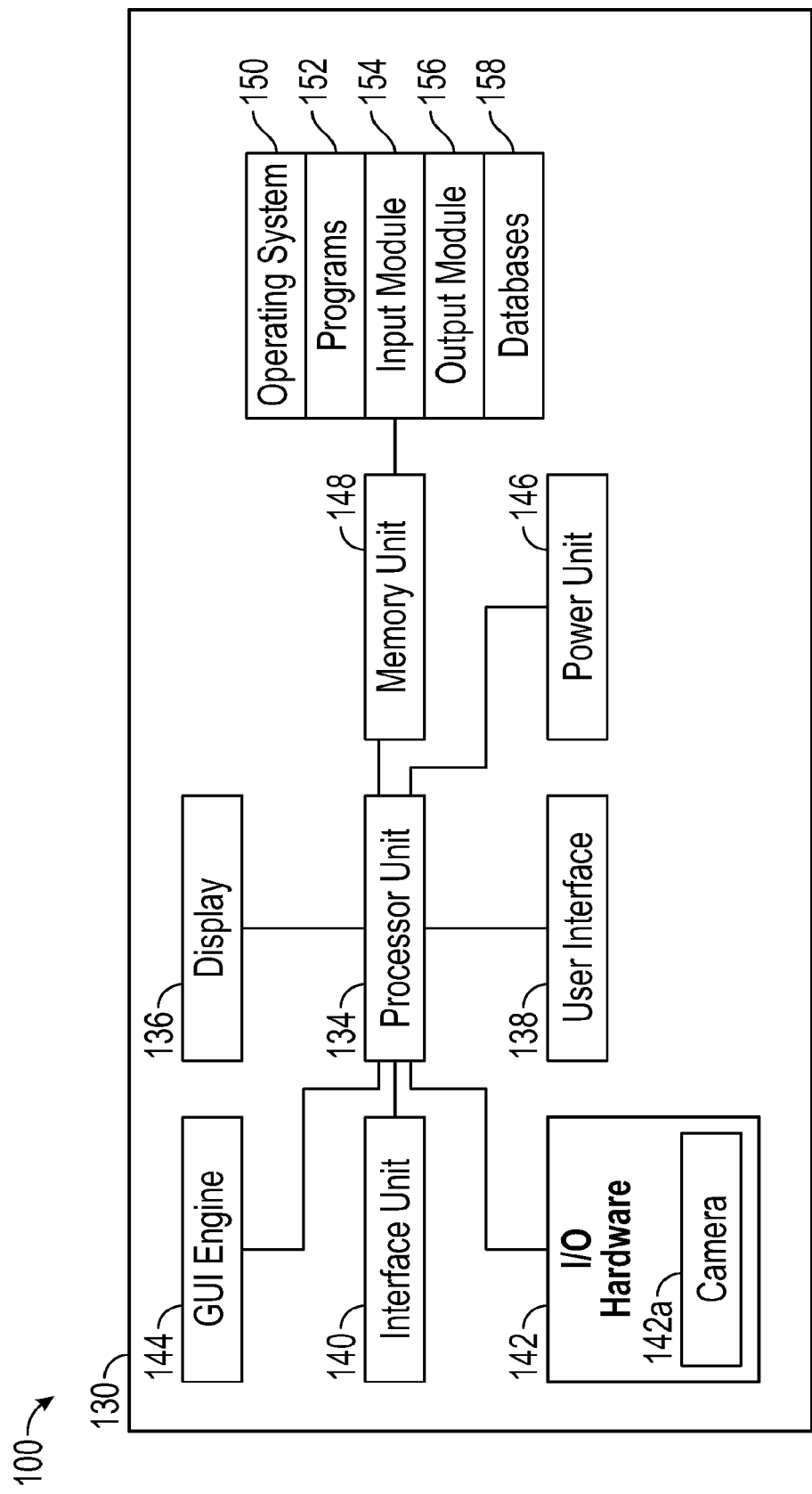
FIG. 1 shows a block diagram of an example embodiment of a system for mobile 3D scanning and measurement.

Further aspects and features of the example embodiments described herein will appear from the following description taken together with the accompanying drawing figures.

DETAILED DESCRIPTION OF THE EXAMPLE EMBODIMENTS

Various example embodiments in accordance with the teachings herein will be described below to provide at least one embodiment of the claimed subject matter. No example embodiment described herein limits any claimed subject matter. The claimed subject matter is not limited to devices, systems, or methods having all of the features of anyone of the devices, systems, or methods described below or to features common to multiple or all of the devices, systems, or methods described herein. It is possible that there may be a device, system, or method described herein that is not an embodiment of any claimed subject matter. Any subject matter that is described herein that is not claimed in this document may be the subject matter of another protective instrument, for example, a continuing patent application, and the applicants, inventors, or owners do not intend to abandon, disclaim, or dedicate to the public any such subject matter by its disclosure in this document.

All novel and nonobvious combinations and sub-combinations are included in the subject matter described herein. This includes combinations and sub-combinations of systems, pipelines, features, or implications of the features, as well as functions, acts, and/or properties disclosed herein and all of the implications thereof.

It will be appreciated that for simplicity and clarity of illustration, where considered appropriate, reference numerals may be repeated among the figures of the drawing to indicate corresponding or analogous elements. In addition, numerous specific details are set forth in order to provide a thorough understanding of the example embodiments described herein. However, it will be understood by persons of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending on the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5%, or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" or "approximately" which means a variation of up to a certain amount of the number to which reference is being made if the end result is not significantly changed, such as 1%, 2%, 5%, or 10%, for example.

It should also be noted that the use of the term "window" in conjunction with describing the operation of any system or method described herein is meant to be understood as describing a user interface for performing initialization, configuration, or other user operations.

The example embodiments of the devices, systems, or methods described in accordance with the teachings herein may be implemented as a combination of hardware and software. For example, the embodiments described herein may be implemented, at least in part, by using one or more computer programs, executing on one or more programmable devices comprising at least one processing element and at least one storage element (i.e., at least one volatile memory element and at least one non-volatile memory element). The hardware may comprise input devices including at least one of a touch screen, a keyboard, a mouse, buttons, keys, sliders, and the like, as well as more specialized input devices such as a controller or a sensor input for a depth image. The hardware may comprise output devices including one or more of a display, a printer, and the like depending on the implementation of the hardware. The combination of software and hardware may include single core or multicore processors with programs (or engines, a library, an API, scripts, and the like) executed on any combination of single, parallel, and distributed processing elements, which may be local or remotely located.

It should also be noted that there may be some elements that are used to implement at least part of the embodiments described herein that may be implemented via software that is written in a high-level procedural language such as object-oriented programming. The program code may be written in C++, C#, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer-readable medium such as, but not limited to, a ROM, a magnetic disk, an optical disc, a USB key, and the like that is readable by a device having a processor, an operating system, and the associated hardware and software that is needed to implement the functionality of at least one of the example embodiments described herein. The software program code, when read by the device, configures the device to operate in a new, specific, and predefined manner (e.g., as a specific-purpose computer) in order to perform at least one of the methods described herein.

At least some of the programs associated with the devices, systems, and methods of the example embodiments described herein may be capable of being distributed in a computer program product comprising a computer-readable medium that bears computer-usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer-usable instructions may also be in various formats, including compiled and non-compiled code.

Data storage systems may include any form of removable media or standalone devices of physical, non-transitory devices to hold data and or any logical instructions or signals required to support the methods and processes described herein.

In accordance with the teachings herein, there are provided various example embodiments for a device for mobile 3D scanning and measurement, systems, and methods of use thereof, and computer products for use therewith.

A system that employs mobile devices in a mobile environment is a non-limiting example. The method used in a mobile device for 3D scanning and measurement may apply to a stationary or a motionless environment or any combination of mobile and any other such non-mobile device made to perform the same method or process. In accordance with the teachings herein, there are various example embodiments for a device for stationary usage or a combination of a stationary with a mobile device, any of which employ 3D scanning and measurement, systems, and methods of use thereof, and computer products for use therewith that are made to perform the same method or process implemented in any online or offline computing system, under any suitable system configuration.

Broadly, at least one example embodiment described in accordance with the teachings herein relates to using a mobile device for 3D scanning of an object to provide a measurement for at least one part of the object. One or more processors (e.g., on the mobile device and/or a remote server) executes program code to: (1) acquire front camera images of the object from a plurality of angles; (2) preprocess the images in 2D and 3D using geometrical structures such as point clouds or meshes; (3) utilize a dynamic global alignment procedure to initialize for an improved iterative closest point (ICP) stitch; (4) compare points in the aligned source point cloud with points in a target point cloud; and (5) segment and extract the required object and measure the extracted object using an appropriate distance function.

Reference is first made to FIG. 1, showing a block diagram of an example embodiment of a system 100 for mobile 3D scanning and measurement. The system 100 comprises a device 130 that can be used to perform the various scanning and measurement functions described herein. The device 130 includes a processor unit 134, a display 136, a user interface 138, an interface unit 140, input/output (I/O) hardware 142 having a camera 142a, a Graphical User Interface (GUI) engine 144, a power unit 146, and a memory unit (also referred to as "data store") 148.

The processor unit 134 controls the operation of the device 130 and can be any suitable processor, controller, or digital signal processor that can provide sufficient processing power depending on the configuration, purposes, and requirements of the device 130 as is known by persons skilled in the art. The processor unit 134 may include one processor. Alternatively, there may be a plurality of processors that are used by the processor unit 134, and these processors may function in parallel and perform certain functions. In alternative embodiments, specialized hardware can be used to provide some of the functions provided by the processor unit 134.

The processor unit 134 can execute a graphical user interface (GUI) engine 144 that is used to generate various GUIs, some examples of which are shown and described herein. The GUI engine 144 provides data according to a certain layout and also receives inputs from a user. The processor unit 134 then uses the inputs received by the GUI from the user to change the operation of the various methods that may be performed in accordance with the teachings herein, to change data that is shown on the display 136, or to show a different GUI.

The display 136 can be any suitable display that provides visual information depending on the configuration of the device 130. For instance, the display 136 may output the various GUIs that are generated by the GUI engine 144. The display 136 may be, but not limited to, a computer monitor or an LCD display depending on the implementation of the device 130 (e.g., a smartphone, a tablet, a laptop, or a desktop computer).

The user interface 138 can include at least one of a mouse, a keyboard, a touch screen, a thumbwheel, a track-pad, a track-ball, a card-reader, gesture or voice recognition software, a virtual reality (VR) headset, and the like again depending on the particular implementation of the device 130. In some cases, some of these components can be integrated with one another.

The interface unit 140 can be any interface that allows the device 130 to communicate with other devices or computers, such as a remote computer or server (e.g., back-end server, web server, or application server). In some cases, the interface unit 140 can include at least one of a serial port, a parallel port, or a USB port that provides USB connectivity. The interface unit 140 can also include at least one of a Wi-Fi, Local Area Network (LAN), Wide Area Network (WAN), Neighborhood Area Network (NAN), Ethernet, Firewire, modem, digital subscriber line connection, or Internet connection. For example, the interface unit 140 can include a standard network adapter such as an Ethernet or 802.11x adapter. The interface unit 140 may include a radio that communicates utilizing CDMA, GSM, GPRS, or Bluetooth protocol according to standards such as the IEEE 802.11 family of standards such as IEEE 802.11a, 802.11b, 802.11g, or 80211n. If such communication is used, the method or process described in this disclosure may be implemented on an available or custom-designed network technology such as but not limited to power line communication carriers or 5G network infrastructure. Various combinations of these elements, and any other element with similar functionality, can be incorporated within the interface unit 140.

The I/O hardware 142 includes, but is not limited to, at least one of a microphone, a speaker, and a printer, for example, depending on the implementation of the device 130. The I/O hardware 142 includes a camera 142a that can be used to obtain the images or video frames of an object to be modeled or measured as described herein. The camera 142a may be an RGB-D (i.e., red, green, blue, and depth) camera, a Kinect camera, a Time of Flight (TOF) camera, an infrared camera, or a thermal imaging camera, or any other camera (or plurality of cameras) that has (or provides) 3D imaging capability. The camera 142a may, for example, be one or more cameras located on any combination of the front or back of the device 130, such as a pair of front and back cameras on a smartphone, or a pair of front cameras on a smartphone, or two front cameras and one back camera on a smartphone.

The power unit 146 can be any suitable power source that provides power to the device 130 such as a power adaptor or a rechargeable battery pack depending on the implementation of the device 130 as is known by persons skilled in the art.

The memory unit 148 can include RAM, ROM, one or more hard drives, one or more flash drives, or some other suitable data storage elements such as disk drives, solid state drives, etc. The memory unit 148 may store the program instructions for an operating system 150, programs 152 comprising program code for various applications, an input module 154, an output module 156, and a database 158. The programs 152 comprise instructions that, when executed, configures the processor unit 134 to operate in a particular manner to implement various functions, tools, processes, applications, and/or methods for the device 130. For example, the program code 152 may include software instructions for various methods described in accordance with the teachings herein. The memory unit 148 may also store various operational parameters, video recordings, images, and/or past results in the database 158.

In at least one example embodiment, the programs 152 comprise instructions that, when executed, configure the processor unit 134 to cause data to be sent or received via the interface unit 140 to or from a remote computer or server such that at least part of the software instructions for the various methods described in accordance with the teachings herein are performed by the remote computer or server. In other embodiments, the device 130 may have more or less components but generally function in a similar manner.

Figure 2:
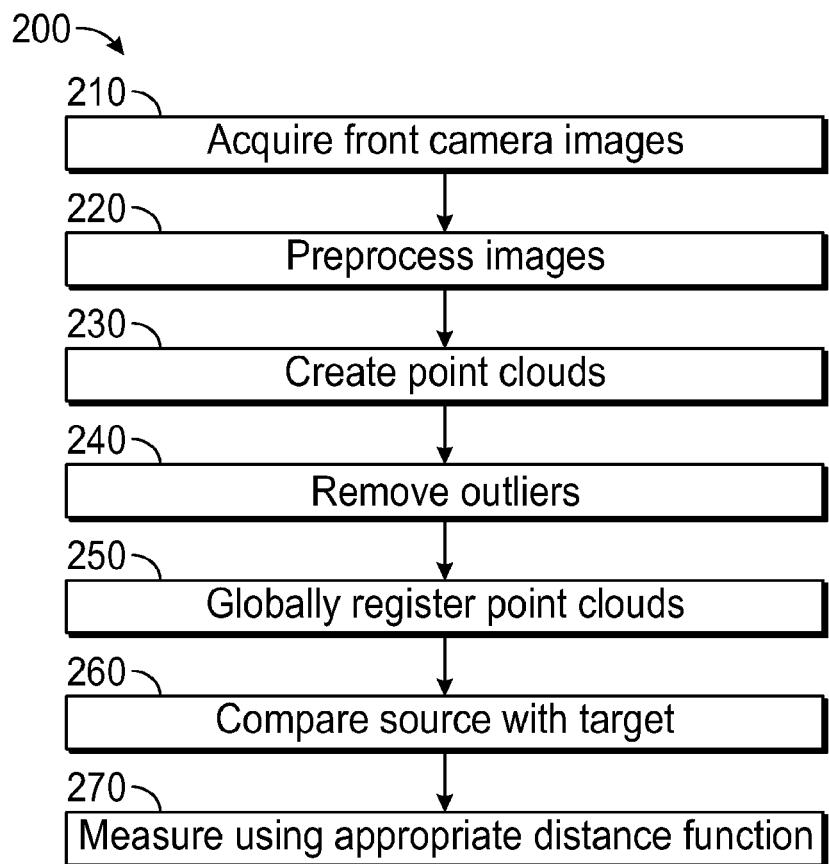
FIG. 2 shows a flow chart of an example embodiment of a method of 3D mobile scanning and measurement.

Referring now to FIG. 2, shown therein is a flow chart of an example embodiment of a method 200 of 3 D mobile scanning and measurement. Method 200 may be carried out, for example, by mobile device 130, processor unit 134, and/or a remote computer or server. At any of the acts/steps comprising method 200, dynamic approaches may involve machine learning, which in one embodiment, for instance, may come in the form of parameter optimization, where the objective is to create optimal stitches, where optimal can be defined, for example, as a significant amount of overlap between stitched point clouds or based on labeled correspondences.

Depending on the use case, the type of the object to be stitched, and the sensor being employed, as well as other characteristics specific to the use case, the system 100 shown in FIG. 1 may need to be tuned in order to achieve the optimal stitching. The optimal stitch may be determined by deducing the optimal parameters relevant to the use case. In at least one example embodiment, the optimal parameters are determined by observational data. In at least one example embodiment, training and test sets consist of point clouds to be stitched, together with a set of features on these point clouds. A machine learning algorithm may, for example, learn the optimal parameters for the system 100 and output the optimal transformation. For example, suppose point cloud A and point cloud B each have 10 labeled feature points that correspond to each other. In such a case, the loss function may incorporate the absolute distance between the 10 corresponding labeled feature points after the stitch is performed.

A variety of machine learning algorithms may be used. As a non-limiting example, the parameter training module may be trained with a supervised learning algorithm such as a convolutional neural network (CNN). Other available machine learning techniques such as recurrent neural networks, Bayesian neural networks, and boosting and bagging algorithms may be used.

Referring to FIGS. 1 and 2, at step 210 of the method 200, the mobile device 130 acquires camera images of an object of interest from different angles or a video stream. The mobile device 130 may collect depth images from a camera 142a, in which case a front camera and/or a back camera, for example, may be employed.

At 220, the mobile device 130 preprocesses the images using morphological refinement. This can be done with either 2D or 3 D inputs. The preprocessing may include filtering masks or kernels to accentuate edges and remove noise around the edges.

Figure 3A:
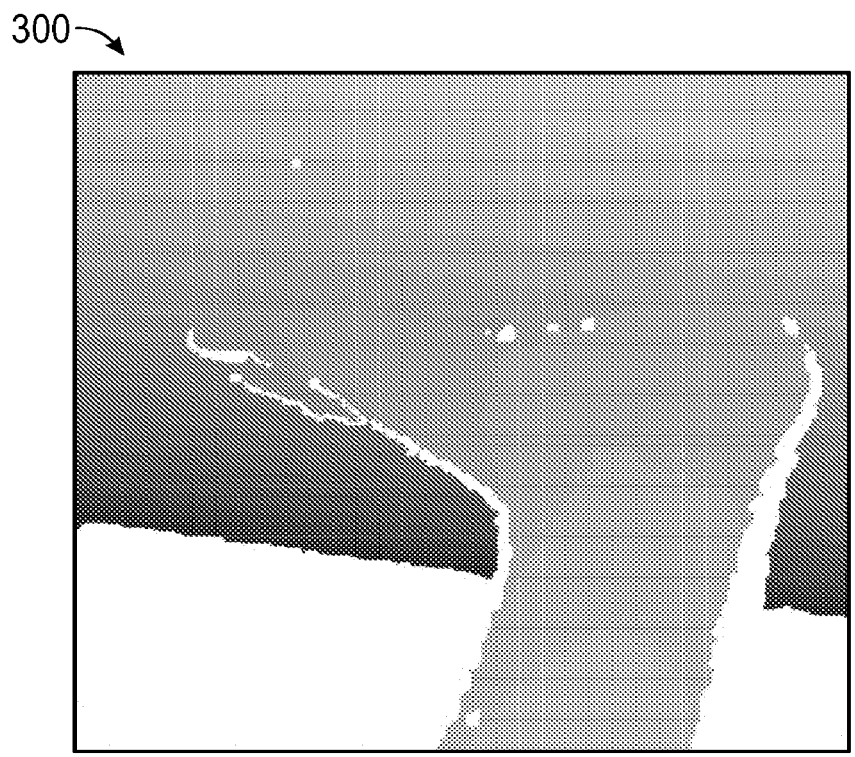
FIG. 3A shows an example of an image of an object before applying morphological refinement.
Figure 3B:
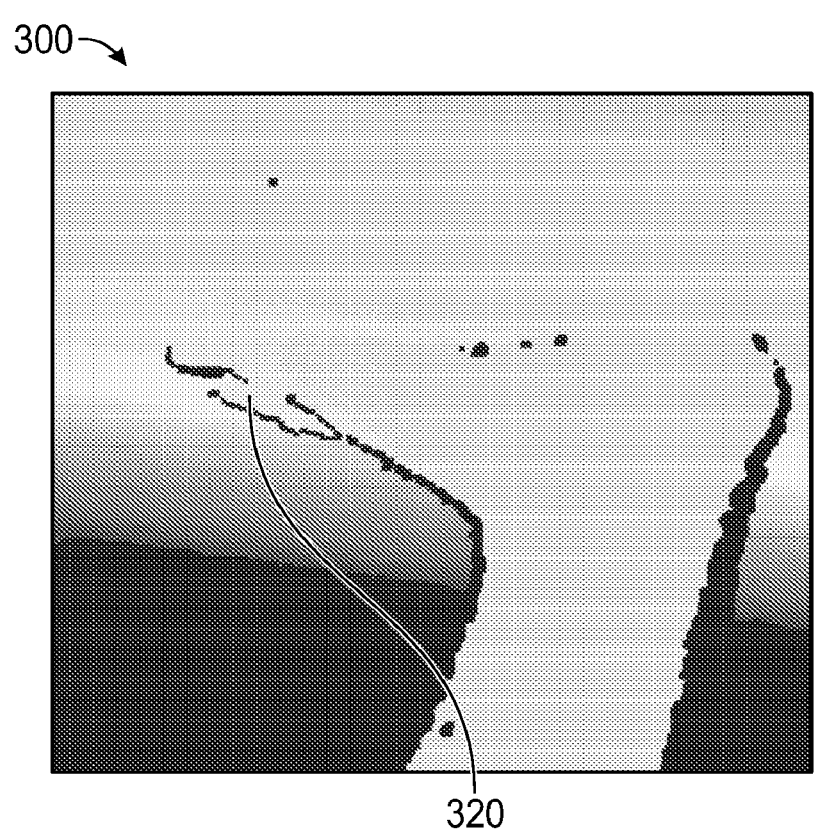
FIG. 3B shows an example of an image of an object after applying the morphological refinement.

FIGS. 3A and 3B show an example of an image 300 of an object (here, a foot) before and after, respectively, one such possible filtering kernel is applied to accentuate edges 320. The preprocessing may include a filtering step to remove noise around edges.

In at least one example embodiment, image processing is performed in 3 D. The edges in 3 D are defined as regions that have any discontinuity in the point cloud/mesh. After identifying such regions, a 3 D ball having a dynamic radius (defined by the region of the edge) slides around the edges. The mobile device 130 may then remove all the points on the point cloud/mesh that overlap with the 3 D ball.

In at least one alternative embodiment, processing is performed in 2D. The edges in 2D are defined as contours around areas of discontinuity in 2D inputs. Once such areas are identified, the mobile device 130 may then remove all the points using a 2D mask.

In at least one additional example embodiment, one or more operations are performed in 3 D, and the remaining one or more operations are performed in 2D.

Depending on the use case, the type of the object to be stitched, and the sensor being used, as well. as other characteristics specific to the use case, the system 100 may need to be tuned in order to deduce the radius for discontinuity removal in a point cloud. For example, in at least one example embodiment, the edge removal is performed on a 2D projected depth image. The radius for edge removal at a point on the depth image may be determined by observational data. In at least one example embodiment, the training and test sets for edge removal consist of depth images with discontinuity, together with a radius for each point along the discontinuity. The machine learning algorithm may learn the radius for each point around the discontinuity, which may correspond to the areas that are to be removed. Since each point has a different radius associated to it, the predicted radius varies along a discontinuity. The localized discontinuity may be removed according to the predicted dynamic radius. The loss function may incorporate the radius associated with each point.

A variety of machine learning algorithms may be used to achieve the foregoing predicted dynamic radius. As a non-limiting example, the radius detection on the image may be trained with a supervised learning algorithm such as a convolutional neural network. Other available machine learning techniques may be used, such as recurrent neural networks, Bayesian neural networks, and boosting and bagging algorithms.

In at least one alternative example embodiment, the discontinuity removal is performed in 3 D, where the dynamic radii can be determined, for example, by training a convolutional neural network on 3 D point clouds. The training and test sets may consist of point clouds having a discontinuity on the surface, together with a radius for each point around the discontinuity. The machine learning algorithm may learn the radius for each point around the discontinuity which corresponds to the 3 D regions that are to be removed. Since each point has a different radius associated to it, the predicted radius varies along a discontinuity. The localized discontinuity may be removed according to the predicted dynamic radius. The loss function may incorporate the radius associated with each point. A variety of machine learning algorithms may be employed to achieve the predicted dynamic radius. Other available machine learning techniques may be used, such as recurrent neural networks, Bayesian neural networks, and boosting and bagging algorithms.

Figure 4A:
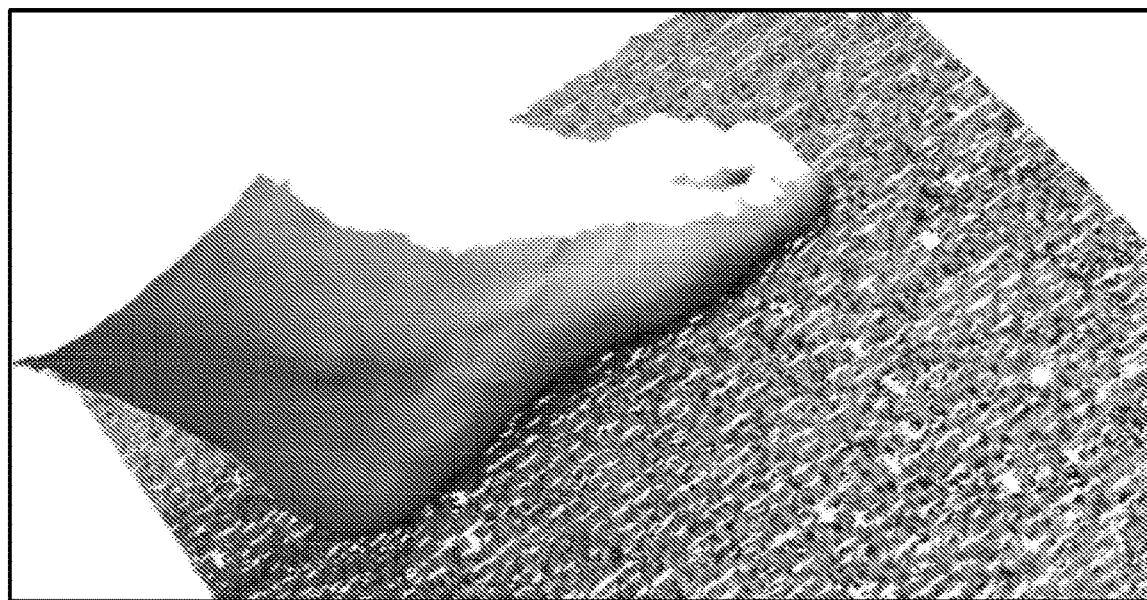
FIG. 4A shows an example of a point cloud before 2-dimensional (2D) and 3-dimensional (3D) outlier removal.
Figure 4B:
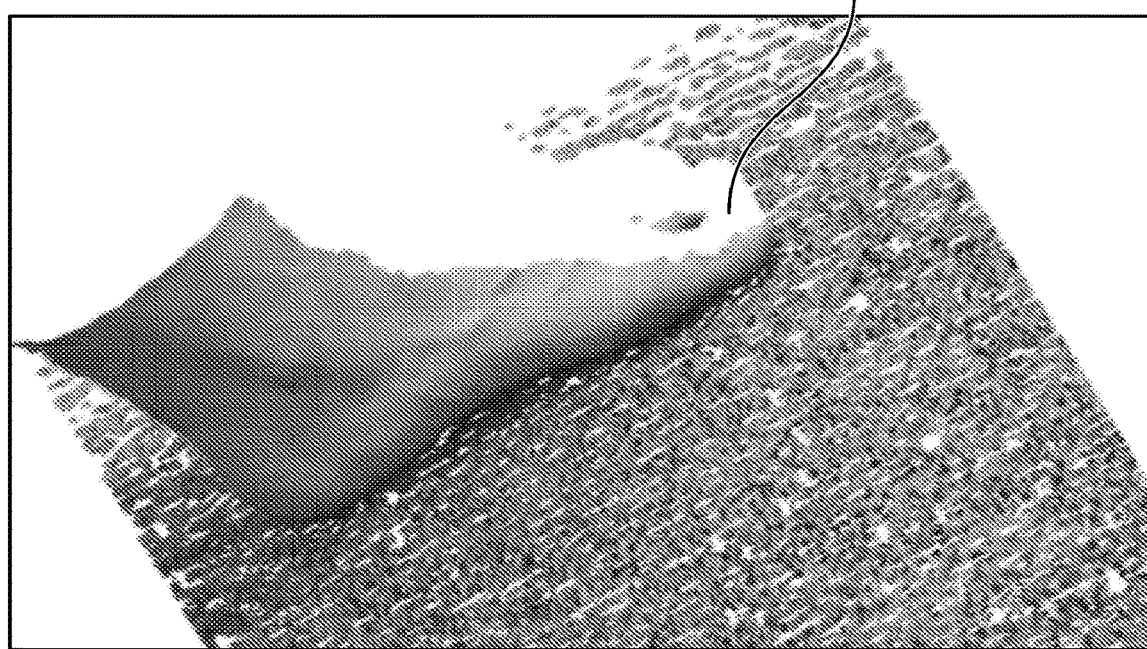
FIG. 4B shows an example of a point cloud after 2D and 3D outlier removal.

Referring again to FIG. 2, at step 230 of the method 200, in accordance with one example embodiment, the mobile device 130 applies 2D and 3 D outlier removal methods. FIGS. 4A and 4B show an example of a point cloud before and after, respectively, outlier 420 being removed. Areas of importance may be extracted. This may involve downsampling, such that the resultant image is the object being measured (here the foot) and not other small objects proximate the object.

Figure 5:
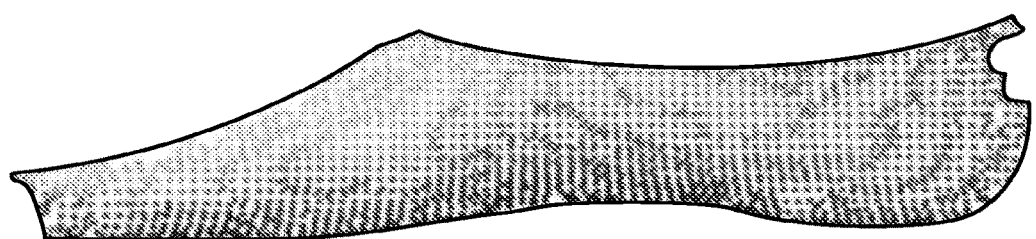
FIG. 5 shows an example of a point cloud after extracting areas of importance.

FIG. 5 shows an example of a point cloud after extracting areas of importance. Areas of importance may be computed through first and second order information to actively find parameters for downsampling and alignment. Parameter search may be based on, but it is not limited to, the distance from the camera 142a, and denseness of the local region, corners, boundaries, and/or other geometric features the object being measured (here, the foot). Around the chosen geometric features, the number of sampled points may be larger.

The following is a non-limiting example of a pseudocode representation of steps in a process applied to a sequence of images captured by the mobile device 130, the pre-processing steps, creation of a geometrical representation such as point clouds from images, and the removal of points or pixels determined to be outliers:

Input: ROB and/or Depth image;
Apply morphological refinement, if needed;
point_cloud←-depth_image+color image, Such as:
    Perform Transformation on the Set of {depth_image} in order to obtain the {point_cloud} Set
    This may involve using camera intrinsics to generate 3 D assets where one such transformation from 2D to 3 D may involve the following: 3d_pixel_coordinate=(initial_x*focal_length/initial_z)+principal_ point;

Outlier removal may involve, among other options, statistical approaches such as:

```
Let n=len(point_cloud);
For p_k, in point_cloud, where k ∈ {1, ... , n}:
    avg_{pk}←- average distance of neighbors of p_k
stdev.p=square_root(sum(avg_{pk} − global_mean)**2 for all p values/n−1)
For p_k in point_cloud:
    inliers <− keep if avg_{pk} < global_mean(avg_{pl} ... avg_{pn}) +
    deviation_constant * stdev.p,
    Otherwise, eliminate each outlier value whose avg_{pk} falls outside the
    margin established by the deviation_constant
End;
```

At step 250 of the method 200 shown in FIG. 2, the mobile device 130 globally aligns point clouds to, for example, initialize for an iterative closest point (ICP) stitch. The mobile device 130 may employ geometrically relevant features such as "fast histogram point features" or machine learning generated features based on labeled correspondences that aim at reducing, for instance, the distance between points in a point cloud that training data has established should be close (in a feature space) to one another.

Figure 6A:
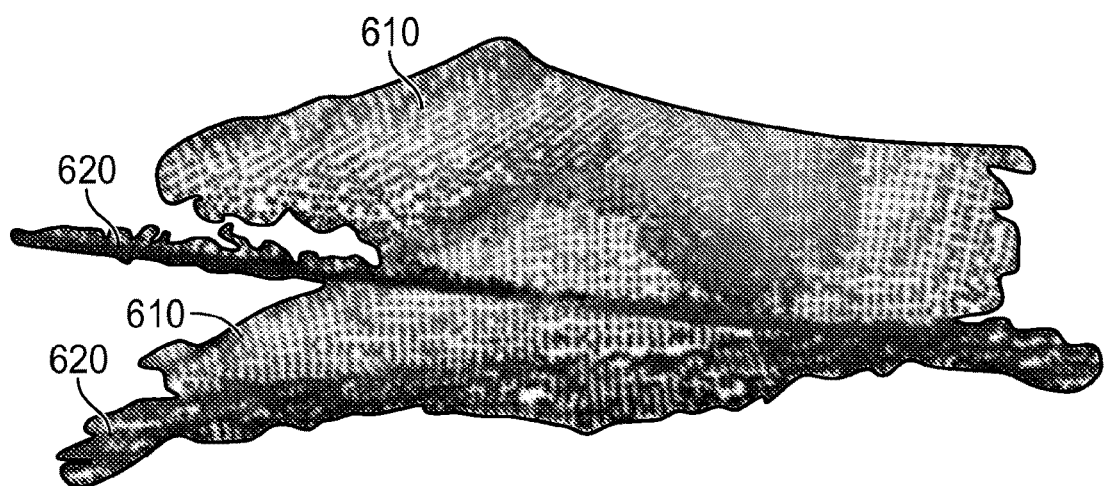
FIG. 6A shows an example of a point cloud before global alignment
Figure 6B:
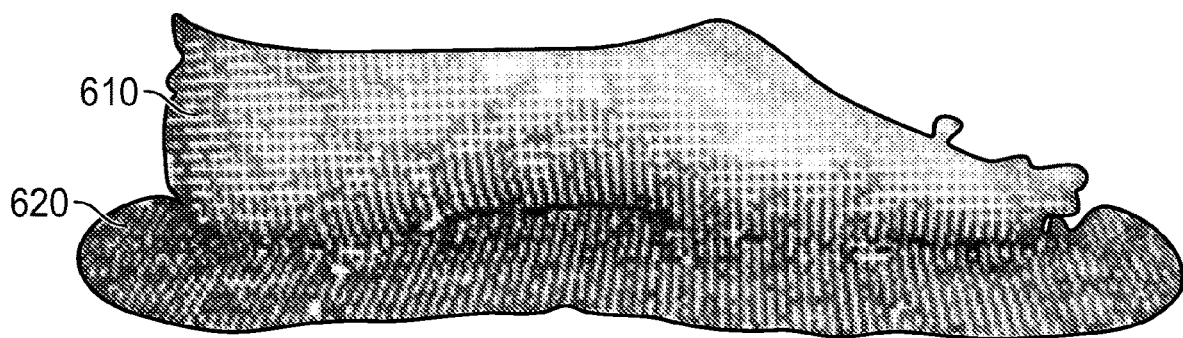
FIG. 6B shows an example of a point cloud after global alignment.

FIGS. 6A and 6B show examples of a point cloud subject to global registration. FIG. 6A shows an example of a point cloud 600 before global alignment of the foot 610 on a surface 620, at two different angles, for which features are computed. FIG. 6B shows an example of the point cloud 650 after feature computation and subsequent global alignment.

Referring to again to FIGS. 1 and 2, at step 260 of the method 200, the mobile device 130 compares points in a transformed (based on the global registration) source point cloud with points in the target point cloud. The mobile device 130 may use a modified version of an ICP stitch, such as an "overlap" ICP. FIGS. 7A, 7B, 7C, 8A, 8B, and 8C show examples of a. point cloud subjected to an overlap ICP stitch.

Considered in more detail, the system 100 shown in FIG. 1 may register point clouds through a comparison between source and target point clouds to find a transformation matrix based on features such as, but not limited to, Fast Point Feature Histograms. The measurement step may be achieved with a method based on a distance function.

In one example embodiment, the transformation matrix may be defined as:

$$\begin{array}{|c|c|} \hline R & t \\ \hline 0^T & 1 \\ \hline \end{array}$$

where $R_{3\times3}$ is a rotation matrix, $0^T_{1\times3}$, is a zero row vector, and $t_{3\times1}$ is a transformation vector applied to each point (x,y,z) of the point cloud.

Figure 7A:
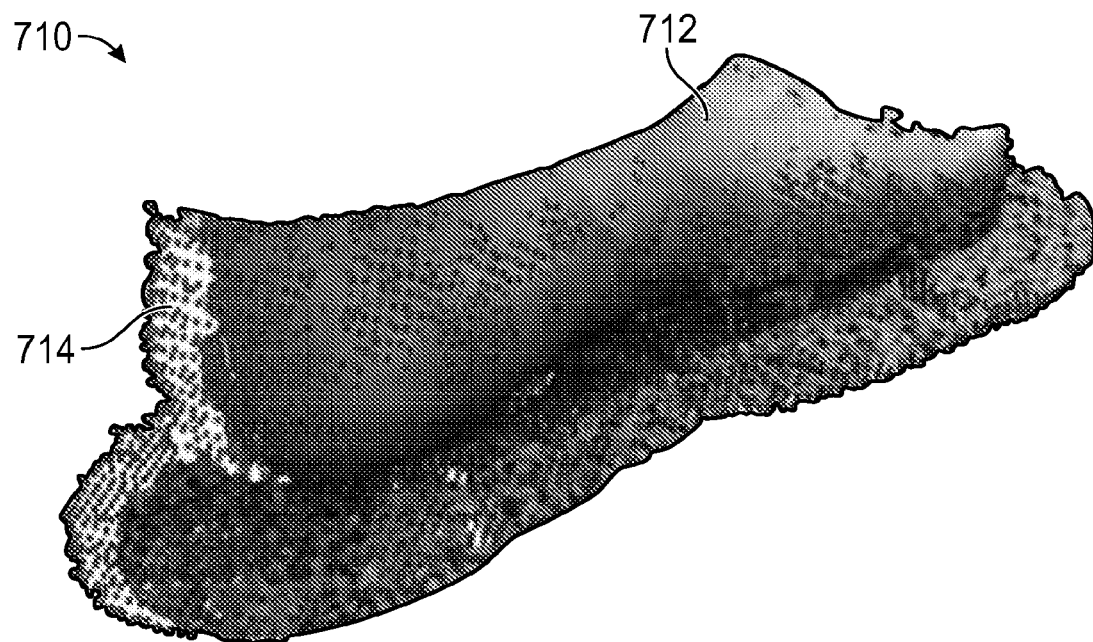
FIG. 7A shows an example of a point cloud after gathering points from dense source point clouds.

FIG. 7A shows an example of a point cloud 710 of a foot represented as a dense source point cloud 712, where points in the dense source point cloud 712 close to a downsampled representation 714 of the foot are imaged. For each point in the downsampled representation 714 of the foot, neighbors in the corresponding dense source point cloud 712 are identified to prepare the image for ICP stitching by obtaining points from the dense transformed source to a dense downsampled target.

Figure 7B:
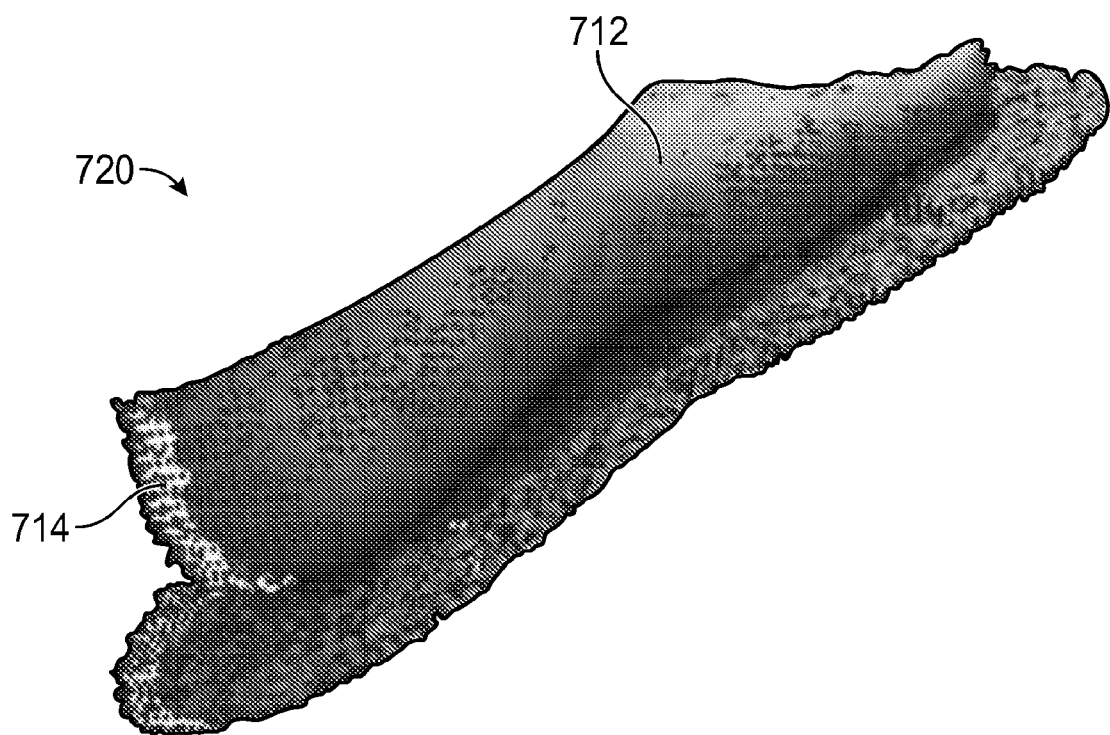
FIG. 7B shows an example of a point cloud after gathering points from a dense target point cloud.

FIG. 7B shows an example of a point cloud 720 of a foot represented as a dense target point cloud 722, where points in the dense target point cloud 722 close to scattered points in a downsampled representation 714 of the foot are obtained. For each point in the downsampled representation 714 of the foot, neighbors in the corresponding dense target point cloud 722 are identified. Once the points are obtained, the result is two input images shown as they appear in space. In this example, both point clouds are quite close to one another already, making final refinement with ICP stitching optimal.

Figure 7C:
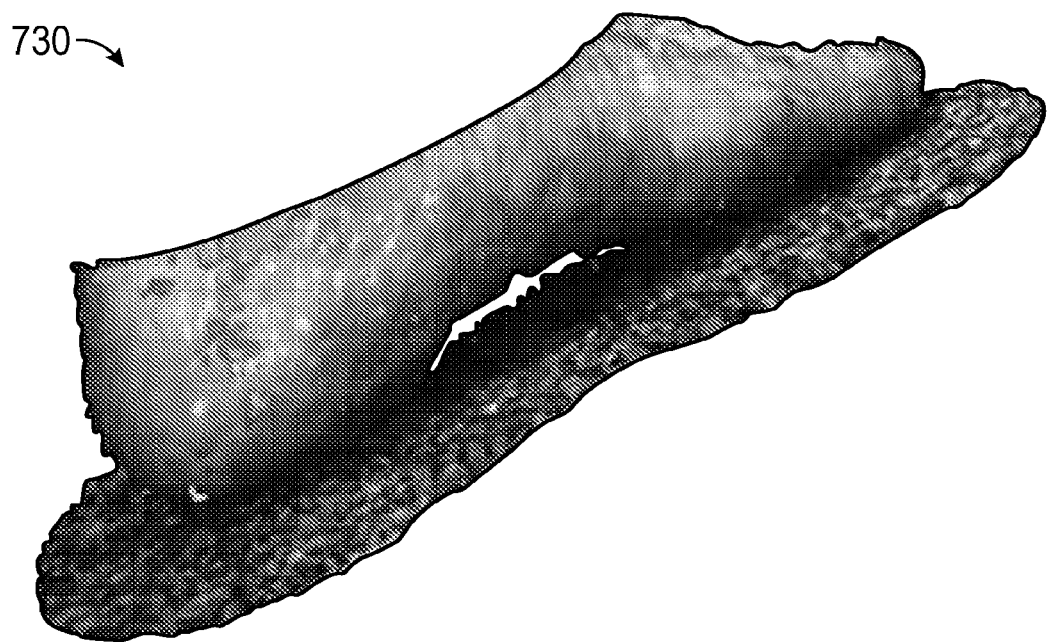
FIG. 7C shows an example of a point cloud after an overlap between stitched point clouds or based on labeled correspondences.

FIG. 7C shows an example of the point cloud 730 after the overlap step 260, where the image can then be used as an input to the ICP stitching. This ICP procedure may be dynamic in the sense that it is based on the parameters computed in method 200, such as at step 230.

Figure 8A:
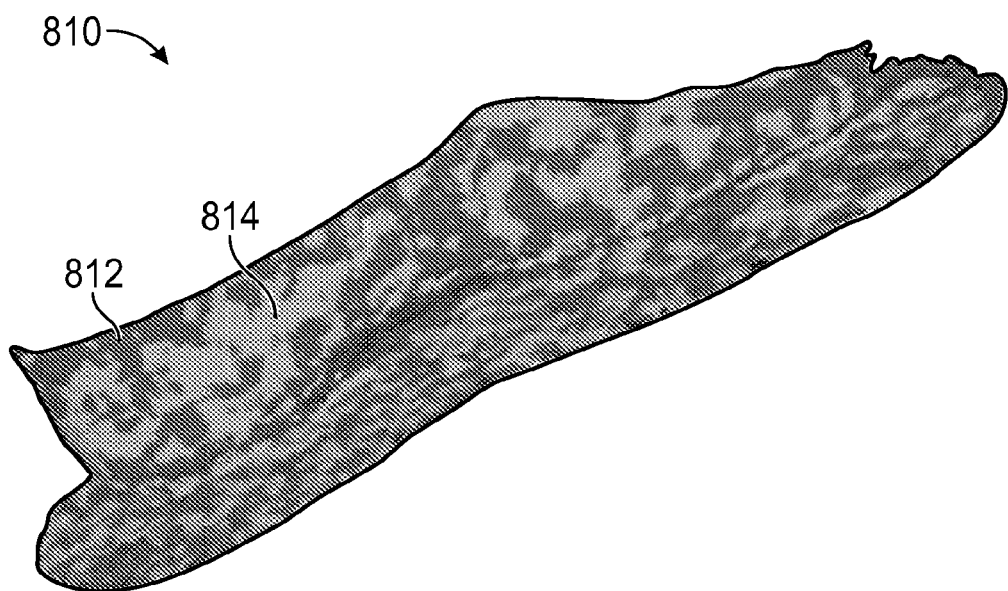
FIG. 8A shows an example of a point cloud after stitching.

FIG. 8A shows an example of the point cloud 810 after final ICP stitching with two different shades, such as dark grey 812 and light grey 814. The different shades show the resultant elements from the ICP stitching. Alternatively, or in addition, more than two shades or different colors may be used. Alternatively, or in addition, the point cloud after final ICP stitching may be displayed using graphic symbols (or variations in shading) to represent the resultant elements from the stitching (e.g., for black and white, or monochromatic, views).

Figure 8B:
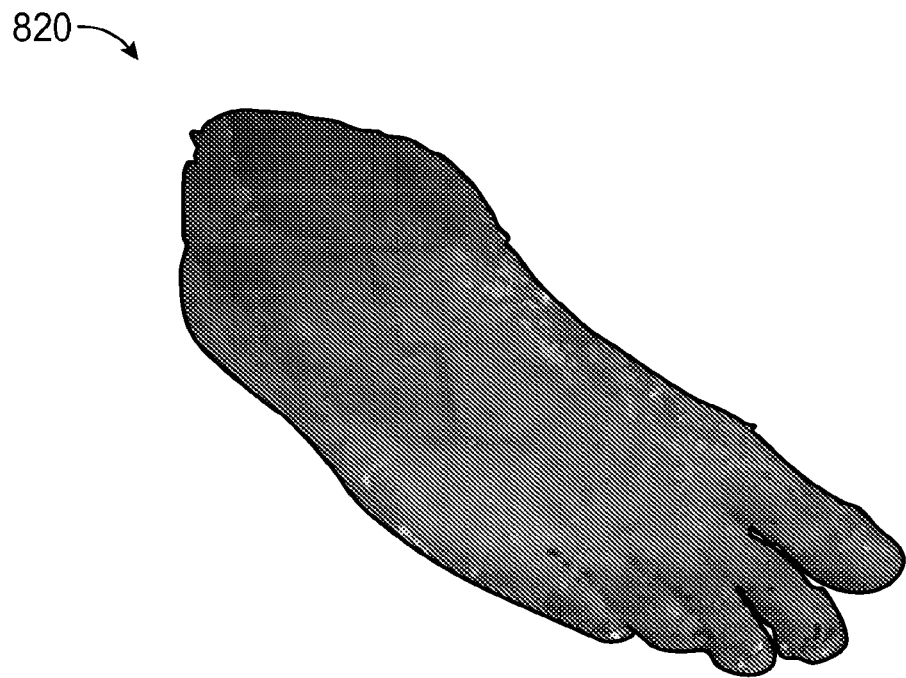
FIG. 8B shows an example of a point cloud after aggregation of stitching of all pairs of images.

FIG. 8B shows an example of the point cloud 820 that results from applying ICP stitching for all pairs of images and then aggregating the stitches to obtain an image for which a measurement can be made.

Figure 8C:
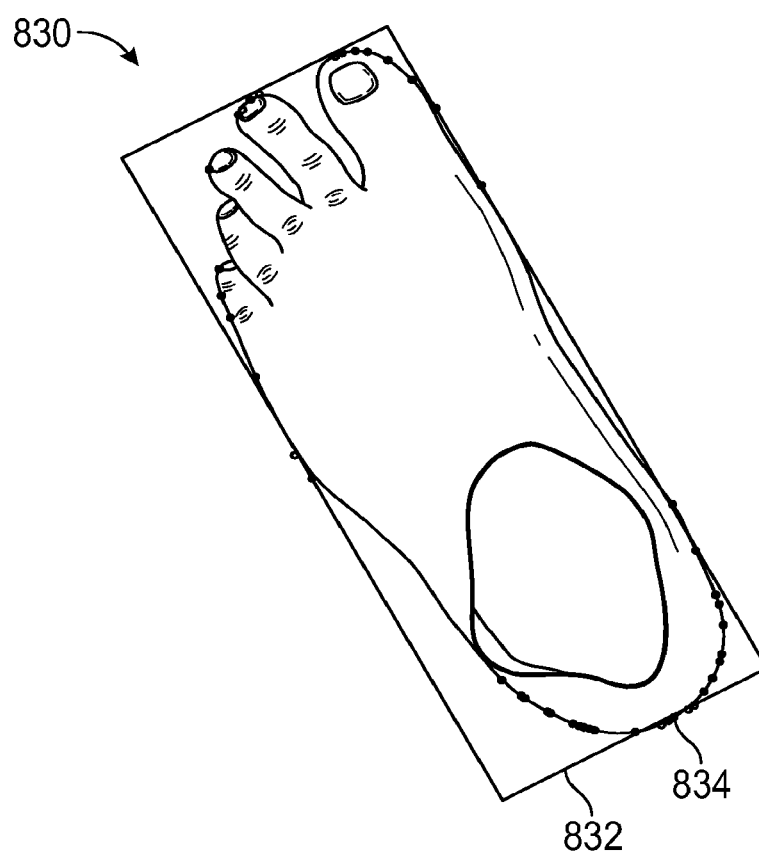
FIG. 8C shows an example of a segmented and extracted object and its corresponding measurement using an appropriate distance function.

Referring again to FIGS. 1 and 2, at step 270 of the method 200, the mobile device 130 measures the final stitched point cloud using, for example, a bounding box from the convex hull of the point cloud, or any appropriate distance function. Another example is the extraction of the fingers on a hand and using the geodesic distance to compute the region where there will be a ring. FIG. 8C shows an example of the segmented and extracted object 830 to be measured using an example of an appropriate distance function, employing a bounding box 832 and perimeter points 834.

Figure 9:
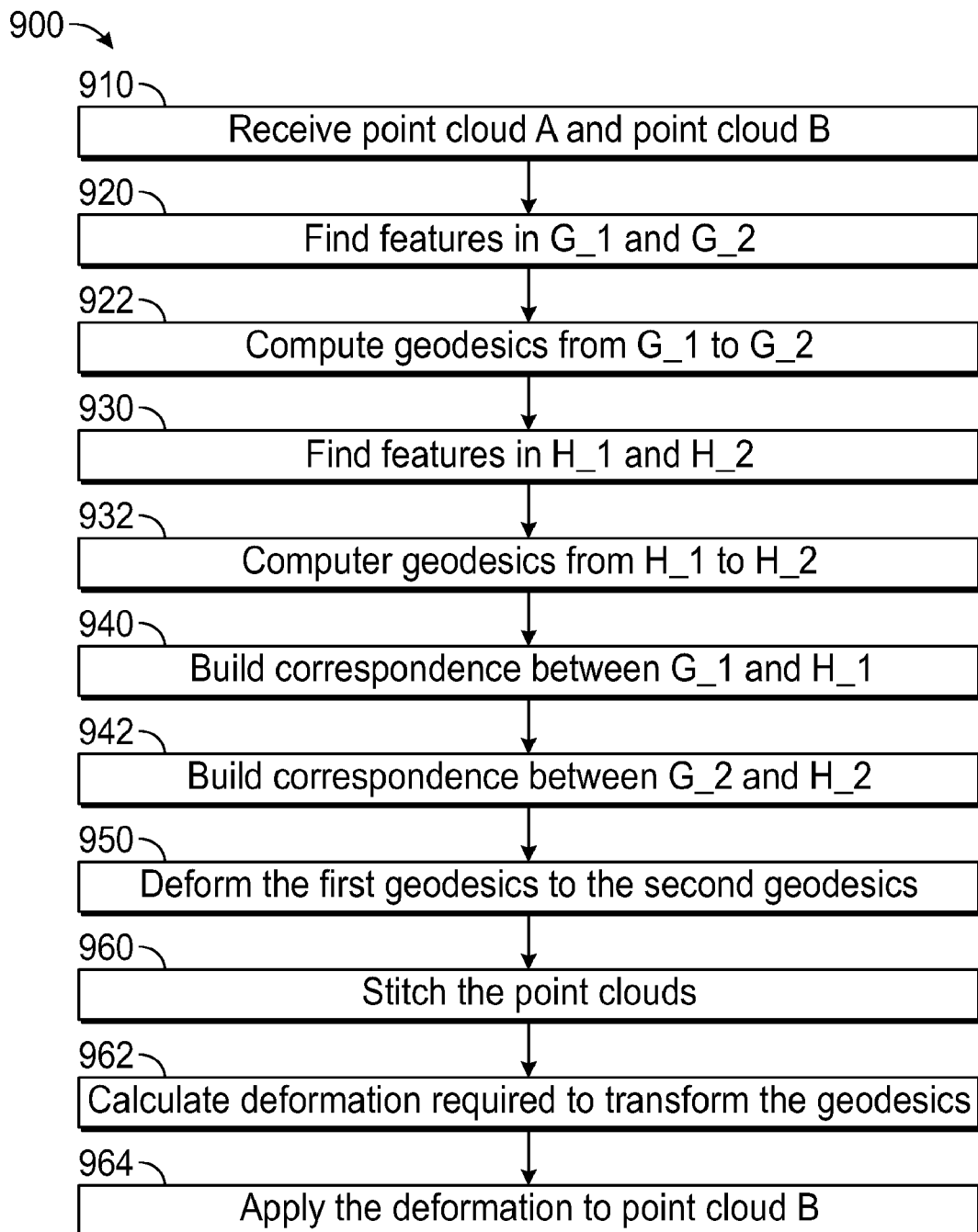
FIG. 9 shows a flow chart of an example embodiment of a method of deformable object stitching.

Referring now to FIG. 9, shown therein is a flow chart of an example embodiment of a method 900 of deformable object stitching. Method 900 may be carried out, for example, by mobile device 130, processor unit 134, and/or a remote computer or server.

At step 910, the mobile device 130, for example, receives a point cloud A and a point cloud B that have partial overlap (PO). Point cloud A is a deformed version of point cloud B.

At step 920, the mobile device 130 finds all prominent features in at least two subregions $G_1$ and $G_2$ in the PO region of point cloud A. To find these features, the primary tool may discover prominent features such as, but not limited to, curvature and lack of smoothness of the point cloud in the PO region.

In at least one example embodiment, the initial prominent features are discovered by first estimating the curvature of the whole point cloud. The neighborhoods with high curvature are then further refined by iteratively re-calculating curvature, wherein in the neighborhoods of prominent features, curvature is re-calculated by considering a smaller neighborhood around the prominent feature. This procedure may be repeated until sampling in a smaller neighborhood does not increase the curvature in that region by more than a specified threshold.

At step 922, the mobile device 130 computes geodesics from $G_1$ to $G_2$, where $G_2$ is re-arranged so that the geodesics connecting $G_1$ to $G_2$ do not overlap at intermediate times. These geodesics may be referred to as the "first geodesics" for ease of reference. In some cases, the geodesics do not overlap due to the lack of complete elasticity of some objects such as a foot, but they may overlap for a hand.

At step 930, the mobile device 130 finds the corresponding prominent features in subregions $H_1$ and $H_2$ in the PO region of point cloud B.

At step 932, the mobile device 130 computes geodesics from $H_1$ to $H_2$, where $H_2$ is re-arranged so that the geodesics connecting $H_1$ to $H_2$ do not overlap at intermediate times. These geodesics may be referred to as the "second geodesics" for ease of reference. The typical result is that the number of points in $G_1$ is the same as those in $H_1$.

At step 940, the mobile device 130 builds a correspondence between $G_1$, and. $H_1$ using a matching technique that matches $G_1$ and $H_1$ according to prominent features (e.g., high curvature), and distance to an element with such features in the PO region of each corresponding point cloud. The number of points in $G_2$ and $H_2$ are typically the same; if not, eliminating points in $G_1$ and $H_1$ is needed to get the equality of both sets.

At step 942, the mobile device 130 builds a. correspondence between $G_2$ and $H_2$ using, for example, a matching technique that matches $G_2$ and $H_2$ according to the prominent features, and distance to an element with such features in the PO region of each corresponding point cloud.

At step 950, the mobile device 130 deforms the geodesics obtained from $G_1$ to $H_1$, to the geodesics obtained from $G_2$ to $H_2$ employing, for example, a surface-based deformation method, such as As Rigid As Possible (ARAP) deformation, mesh deformation, or Laplacian deformation. Deformations such as bending do not change the length of the geodesic on the surface, but change their first and second order information, whereas affine deformations such as stretching change the length of the geodesics.

The initial points may be specified by $G_1$ and $G_2$, and the final points specified by $H_1$ and $H_2$. The optimal rigid transformations may be performed using ARAP (see, e.g., Sorkin, O., and Alexa, M. (2007), As-rigid-as-possible surface modeling, in Proc, SGP, 109-116), from the initial to the final points. Note that by the correspondences found between $G_1$ and $H_1$ (or $G_2$ and $H_1$), it can be determined that $G_1$ and $H_1$ (or possibly a subset thereof) are a collection of fixed points. For example, one can run "overlap ICP" to align $G_1$ and $H_1$, and use $G_2$ and $H_2$ as initial points and final points, respectively, for the ARAP deformation method.

In at least one implementation, the fixed points are deduced from the geometry of the surface (i.e., they are intrinsic to the surface, as opposed to pre-specified by the user). ARAP is employed to stitch the point clouds, as opposed to deform the final stitched point clouds. This can be interpreted as an inverse problem to that in the ARAP deformation method.

At step 960, the mobile device 130 stitches the point clouds using, for example, an image alignment technique such as ICP.

At step 962, the mobile device 130 calculates the deformation required to transform the geodesics from $G_1$ to $G_2$ to the geodesics from $H_1$ to $H_2$ employing, for example, the surface-based deformation method.

In at least one implementation, the mobile device 130 selects a particular geodesic connecting one point from $G_1$, designated $x_1$, to another point in $G_2$, designated $x_2$. It denotes the geodesic connecting these points by g(t) for $t \in [0,1]$. It denotes $$v_1 = \frac{d}{dt}g(t)\bigg|_{t=0}, \text{ and } v_2 = \frac{d}{dt}g(t)\bigg|_{t=1}.$$

It uses the inner product to determine the tangent vectors that are perpendicular to g at $x_1$ and at $x_2$ (i.e., selects $w_1$ and $w_2$ that are perpendicular to $v_1$ and $v_2$, respectively). It then produces two more geodesics by traveling along the surface with the directions $w_1$ and $w_2$. It produces two more points by following these geodesics for E time, designated $x_3$, $x_4$. Then it can produce a geodesic that connects $x_3$ to $x_4$. This produces a parameterized surface $\Sigma_1$ on the point cloud A. It repeats the procedure above with points from $H_1$ and $H_2$ that match up with $x_1$ and $x_2$ to produce a similar surface $\Sigma_2$ on the point cloud B.

In at least one implementation, the mobile device 130 computes the first and the second fundamental forms of $\Sigma_1$, $\Sigma_2$. By the Gauss-Bonnet theorem (see, e.g., Toponogov, Victor Andreevich (2006), Differential geometry of curves and surfaces, Boston, MA: Birkhäuser Boston, Inc., p. 132, ISBN 978-0-8176-4384-3, MR 2208981), the first and second fundamental forms of a surface classify the surface uniquely to rigid transformations. It uses this to match up the surfaces $\Sigma E_1$ and $E_2$. If the fundamental forms of these two surfaces are identical, then the process completes. Otherwise, it uses "overlap ICP" as well as ARAP to modify the surfaces until their fundamental forms of surfaces $\Sigma_1$, and $E_2$ match up completely.

In at least one implementation, the mobile device 130 repeats this process over all combinations in the points in $G_1$, $G_2$, and $H_1$, $H_2$. Since the fundamental forms are modified in every step until they match up, and there are finitely many points in $G_1$, $G_2$, $H_1$, $H_2$, this results in the rigid transformations (derived from overlap ICP) that take the respective parameterized surfaces point cloud A to point cloud B. Once the fundamental forms on all patches that are in correspondence match up, the process completes, and it ends up with point clouds that are related to one another by a rigid transformation. By reverting to this process, it provides a transformation that takes two point clouds that are deformed versions of one another, and produces a transformation that aligns one of the point clouds to the other point cloud.

At step 964, the mobile device 130 applies the deformation to the entire point cloud. B to deform it to match up to point cloud A.

In at least one embodiment, method 900 iterates from step 920 to step 964 for all the images in the point clouds.

Temporal information and orientation of the object may be used to identify exactly how each pair of photos is related. The ranking of points based on features such as similar curvature in each point cloud may aid with loop completion.

Figure 10:
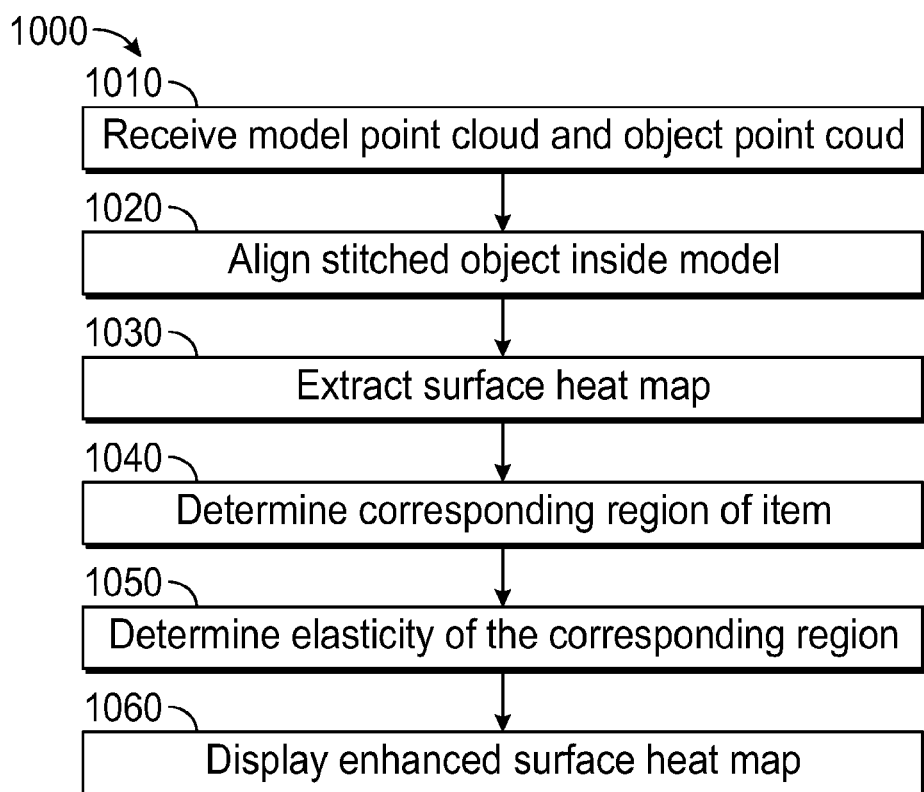
FIG. 10 shows a flow chart of an example embodiment of a method of fitting a 3D model item over another 3D model.

Referring now to FIG. 10, shown therein is a. flow chart of an example embodiment of a method 1000 of fitting a 3D model of an item over an object. Method 1000 may be carried out, for example, by mobile device 130, processor unit 134, and/or a remote computer or server.

At step 1010, the mobile device 130, for example, receives a model point cloud and an object point cloud. The model point cloud may be a 3D model that may include the interior of an item (e.g., shoe, glove, pillow case) to be fitted to an object of interest (e.g., foot, hand, pillow). For some use cases, the object may have different weight loadings.

Figure 11A:
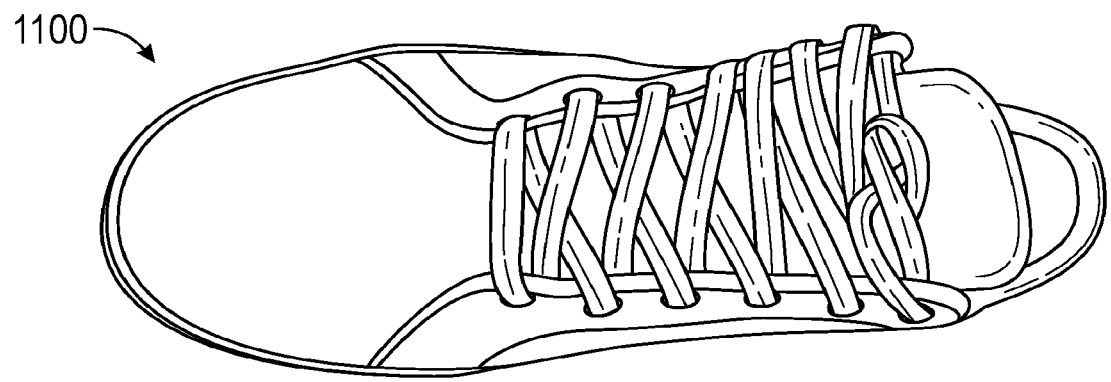
FIG. 11A shows an example of a point cloud of a 3D model of a sample of an artifact such as a shoe.
Figure 11B:
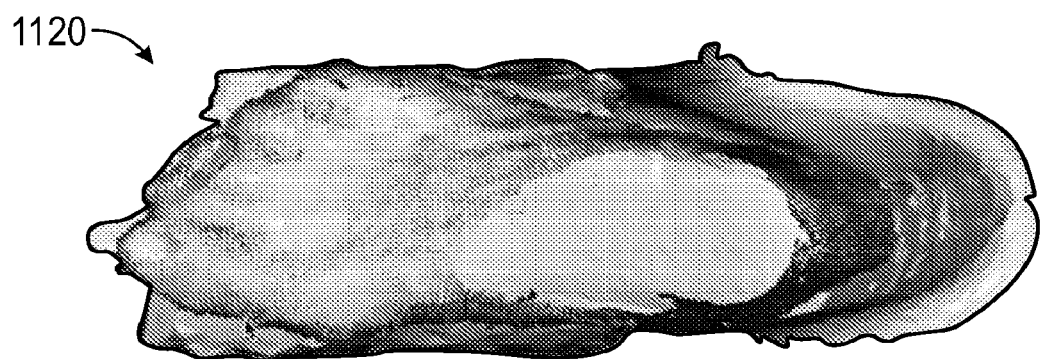
FIG. 11B shows an example of a point cloud of the interior of a shoe aligned with a foot.

At step 1020, the mobile device 130 aligns a 3D item and an object of interest (which may have been stitched), both represented with geometries (e.g., point clouds or meshes). The alignment may be performed by locating the interior of the item to be fitted, aligning the object and the interior of the item with an. initial transformation, and generating a final fitting of the interior of the item and the object of interest. FIG. 11A shows an example of a point cloud of the 3D model of a shoe (the item to be fitted). FIG. 11B shows an example of a point cloud of the interior of the shoe aligned with a foot (the object of interest).

In at least one example embodiment, the mobile device 130 aligns the stitched object inside a 3D item, such as a shoe (see e.g., FIG. 11A and FIG. 11B) in accordance with the following pseudocode representation:

Input 1: Model point cloud of object1 [shoe]
Input 2: Stitched point cloud of object2 [foot]
Make sure the objects have the same scale so there is a basis for comparison.
Otherwise, rescale one object relative to the other.
As an example, find the center of mass for both objects to align the objects. The center of mass can be defined as the average of the x,y,z of all the points in the point cloud for each object.
Subtract the center of mass from each point in the point cloud of object1.
Repeat for object2.
Apply an alignment procedure, comprising:
Transformation and perturbation of coordinates of the stitched object2 that needs to be fitted into the model object1.
Optimization according to an objective function resulting from the interaction between the two objects.
Extraction of the surface heat map of the interaction between the fitted object2 and the model object1 (see e.g., FIG. 12).
End.

FIG. 11A shows an example of a point cloud of a 3D model of a shoe 1110. FIG. 11B shows an example of a point cloud of the interior of the shoe 1120 aligned with a stitched point cloud of a foot. FIGS. 11A-11B show examples of the types of point clouds that method 1000 may use for extracting a heat map.

Referring again to FIG. 10, at step 1030 of the method 1000, the mobile device 130 extracts a heat map from the interaction. of the object with the interior of the item to be fitted. This may, for example, minimize the amount of collision between the item and the object.

Figure 12:
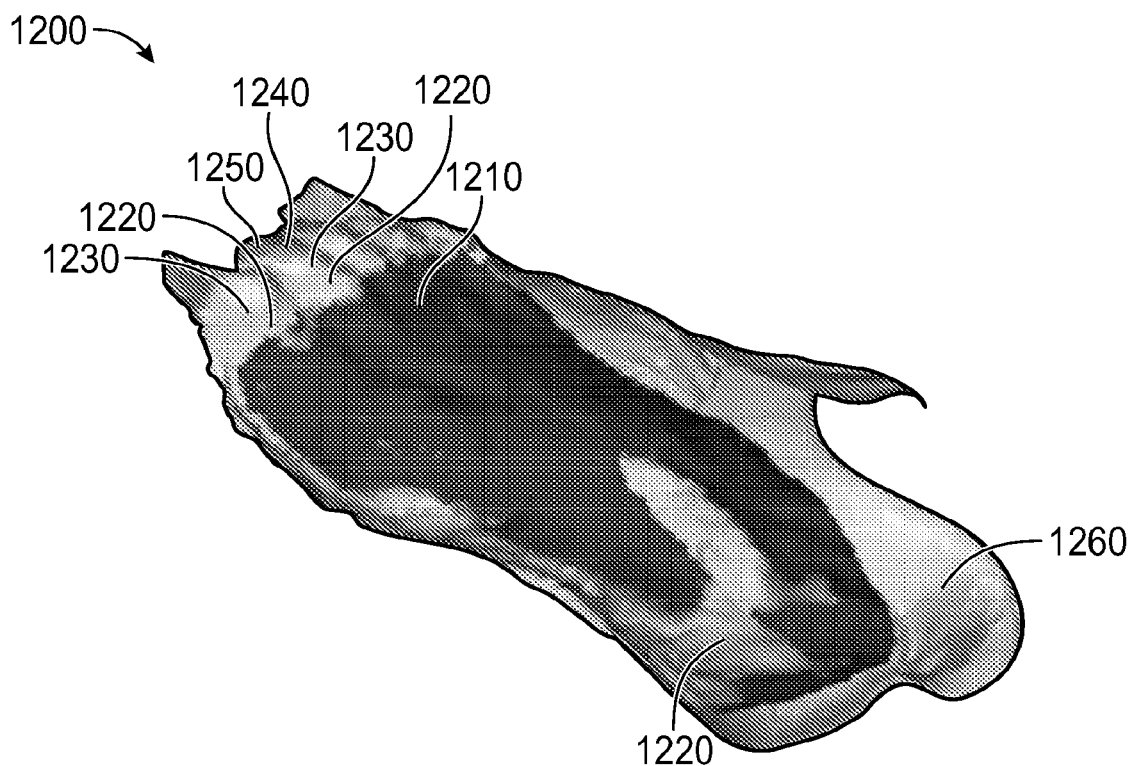
FIG. 12 shows an example of a heat map of an interior geometry such as a foot to be fitted onto an artifact such as a shoe which represents a foot interacting with the inside of the shoe.

FIG. 12 shows an example of a heat map 1200 of a foot interacting with the surface of the inside of a shoe. For example, FIG. 12, when rendered in color, may provide a heat map 1200 where the degree of interaction between the object with the interior of the item to be fitted may be represented by a range of colors such as blue 1210, green 1220, yellow 1230, orange 1240, and red 1250, where the "cold" colors (e.g., blue and green) represent the least amount of interaction, the "warm" color (e.g., yellow) represents more interaction, and the "hottest" colors (e.g., orange and red) represent the most interaction, while grey 1260 represents no interaction. When viewed in greyscale, the heat map 1200 may be represented, for example, by a darkest shade of grey (analogous. to blue) to a lightest shade of grey (analogous to red).

Referring again to FIG. 10, at 1040 of the method. 1000, the mobile device 130 uses the points with the highest heat value (e.g., represented with reddish colors) to determine areas of interest that may need some stretching. Such areas of interest may include areas in the item that are too close to the object into which it is fitted.

Method 1000 can be adapted to provide a heat map for various possible interactions between an item and another item to determine those areas of interest needed for further processing such as, but not limited to, stretching. In the different possible interactions, method 1000 may apply to self-measurement or measurements by another. In the case of self-measurement, method 1000 may be carried out, for example, within the privacy of a user's home. While primarily described with reference to the mobile device 130, it should be understood that method 1000 may be performed by any device(s) and/or processor(s) in a mobile, static, or hybrid of mobile-static configuration.

As an example, for the adjustment of a ski boot, a heat map can be applied to the interaction between a body part and an item to determine those areas of interest that need stretching. The ski boot use case is an example of measuring the form of a foot to fit into a ski boot and determine the areas that need adjustment. Similar use cases include any sporting gear or equipment that requires sizing in relation to the size of a body part.

As an example, for the digital sizing of a bra, a heat map can be applied to the interaction between a body part such as breasts and an item such as a bra to determine those areas of interest that need stretching to determine optimal sizing.

As another example, for the digital sizing of a prosthetic, cast, walking cast, or any splint: care, a heat map can be applied to the interaction. between a body part that requires an artificial body part or supporting object in nearly any shape, size, or configuration to provide support to a body part in order to determine those areas of interest that need stretching to determine optimal sizing.

As an example, for the digital sizing of an oxygen mask, a heat map can be applied to the interaction between a face and the item (i.e., the oxygen mask in this instance) to ensure a seal between the face of a person and the oxygen mask.

As yet another example, for the digital sizing of jewelry or accessories (e.g., rings, headsets, bracelets, necklaces, watches and their straps, and the like), a heat map can be applied to the interaction between a body part and an item to determine those areas of interest that need stretching to perform the same method or process disclosed herein in order to determine the optimal sizing.

As an example, for the digital sizing of an article of clothing, a heat map can be applied to the interaction between a body part and an item to determine those areas of interest that need stretching to determine optimal sizing.

More generally, for any deformable object, stitching illustrates the modifications or deformation of the original form of an object. Method 1000 may, for example, be applied to self-assess or analyze a body part such as a human's nose to allow illustrations of a range of modifications or deformations or departure from the original form. Alternatively, or in addition, method 1000 may apply a heat map to the interaction of a virtual representation of a body part to an item, to the interaction of the body part to a virtual representation of the item, or to the interaction of a virtual representation of a body part to a virtual representation of the item, such as in virtual reality (VR) or augmented reality (AR).

At 1050, the mobile device 130 uses the item's material properties (e.g., from material information provided by the manufacturer of the item) to determine the elasticity of areas of interest. The material information may include, but is not limited to, yield strength, tensile strength, yield point, fracture point, and material fatigue. A. global consistency check may be run to assure the item to fit has a reasonable shape with respect to the object that it fits to or into, or to ensure the integrity of the object by avoiding among other issues, breakage or permanent deformation of materials due to excessive stretching.

In at least one implementation, steps 1040 and 1050 are repeated (e.g., in as program loop) to better fit the item to the object of interest. If the item's material has stretched within its elasticity bounds and it accurately fits to the object of interest, the iteration of steps 1040 and 1050 may then stop. Otherwise, other item sizes can be tried depending on the use case.

The information may then be used directly for, among other uses, visualization purposes, or as input for further processing to, among other use cases, find the correct size for the object to fit to (e.g., shoe size).

At step 1060, the mobile device 130 displays the heat map (e.g., to the person being fitted), and uses the elastic material information to suggest by how much the item will stretch at the points of interest.

Figure 13:
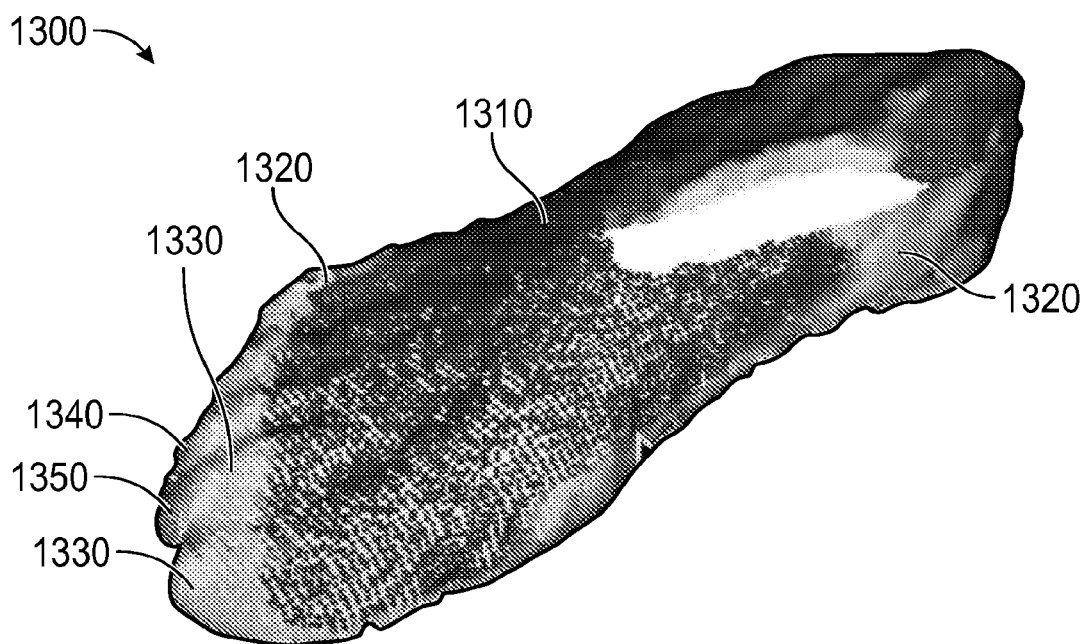
FIG. 13 shows an example of an enhanced heat map.

FIG. 13 shows an example of a heat map of a foot with the suggested modifications based on the elasticity of the shoe while worn. For example, FIG. 13, when viewed in color, may provide a heat map 1300 where the degree of interaction between the object with the interior of the item to be worn may be represented by a range of colors such as blue 1310, green 1320, yellow 1330, orange 1340, and red 1350, where the "cool" colors (e.g., blue and green) represent the least amount of interaction, the "warm" color (e.g., yellow) represents a middle amount of interaction, and the "hottest" colors (e.g., orange and red) represent the most interaction, while grey 1360 represents no interaction.

In at least one example embodiment, the mobile device 130 uses machine learning for at least one of the operations performed during method 200.

In at least one example embodiment, the mobile device 130 uses machine learning for at least one of the operations performed during method 900.

In at least one example embodiment, the mobile device 130 uses machine learning for at least one of the operations performed during method 1000.

In at least one example embodiment, the system 100 uses machine learning, whether it be for optimization purposes or for extensions that rely on, or are related to, one or more of method 200, method 900, method 1000, any steps thereof, alone or in combination, as well as any other operations or processes (or portions thereof) described herein. Alternatively, or in addition, any extension of the methods, operations, or processes (or portions thereof) may benefit from data-driven strategies.

While the teachings described herein are in conjunction with various example embodiments for illustrative purposes, it is not intended that the teachings be limited to such embodiments as the embodiments described herein are intended to be examples only. To the contrary, the teachings described and illustrated herein encompass various alternatives, modifications, and equivalents, without departing from the example embodiments described herein, the general scope of which is defined in the appended claims.

What is claimed is:

1. A system of deformable object stitching, comprising:
a mobile device to scan a plurality of images of an object, the plurality of images providing views of the object from at least two angles;
at least one processor coupled to the mobile device to process the plurality of images of the object, the plurality of images providing views of the object from at least two angles comprising a first point cloud and a second point cloud;
a non-transient computer-readable storage medium having stored thereon computer-executable instructions that, when executed by the at least one processor, cause the system to:
receive the first point cloud and the second point cloud having a partial overlap;
find first prominent features in a subregion $G_1$ and a subregion $G_2$ in a region of the partial overlap;
determine first geodesics based on the first prominent features;
determine second prominent features in a subregion $H_1$ and a subregion $H_2$ in the region of the partial overlap;
determine second geodesics based on the second prominent features;
generate a first correspondence between the subregion $G_1$, and the subregion $H_1$;
generate a second correspondence between the subregion $G_2$ and the subregion $Hz$;
deform the first geodesics and the second geodesics based on the first correspondence and the second correspondence;
stitch the first point cloud and the second point cloud, whereby a stitched point cloud is generated;
calculate a required deformation to transform the first geodesics to the second geodesics; and
apply the required deformation to the second point cloud to match the second point cloud to the first point cloud, whereby a refined stitched point cloud is provided.

2. The system of claim 1, wherein the instructions to find the first prominent features comprise instructions to:
estimate a curvature in the subregion $G_1$ or the subregion $G_2$; and then
refine the estimated curvature by an iterative calculation of the curvature over one or more iterations, such that a region of high curvature is re-calculated by considering a smaller neighborhood in the region of high curvature;
calculate the curvature based on the smaller neighborhood; and
repeat the iterations until sampling in the smaller neighborhood does not increase the curvature in the region of high curvature by more than a specified threshold.

3. The system of claim 1, wherein the instructions to find the second prominent features comprise instructions to:
estimate a curvature in the subregion $H_1$ or the subregion $H_2$; then
refine the estimated curvature by an iterative calculation of the curvature over one or more iterations, such that a region of high curvature is re-calculated by considering a smaller neighborhood in the region of high curvature;

calculate the curvature based on the smaller neighborhood; and repeat the iterations until sampling in the smaller neighborhood does not increase the curvature in the region of high curvature by more than a specified threshold.

4. The system of claim 1, wherein the instructions to find the first prominent features comprise instructions to:

approximate a curvature on the subregion $G_1$ and the subregion $G_2$ by discretizing a curvature operator; and extract the first prominent features with respect to the curvature where the curvature is high or zero, a high curvature representing sharp corners and a zero curvature representing a flat region.

5. The system of claim 1, wherein the instructions to find the second prominent features comprise instructions to approximate a curvature on the subregion $H_1$ and the subregion $H_2$ by:

a discretization of a curvature operator; and an extraction of the second prominent features with respect to the curvature where the curvature is high or zero, a high curvature representing sharp corners and a zero curvature representing a flat region.

6. The system of claim 1, wherein the instructions to determine the first geodesics and the instructions determine the second geodesics comprise instructions to:

triangulate on the respective subregions; and determine a shortest path between two points on a triangulated surface.

7. The system of claim 1, wherein the instructions to generate the first correspondence and the instructions generate the second correspondence comprise instructions to:

rank the first prominent features and the second prominent features, respectively, by curvature in the first point cloud and the second point cloud, respectively; and match points between the first point cloud and the second point cloud.

8. The system of claim 1, wherein the calculate the required deformation comprise instructions to:

produce a first surface determined by connecting any two points between subregion $G_1$ and subregion $H_1$, produce a geodesic, and extend the geodesic into a second surface by considering a neighborhood about the geodesic.

9. The system of claim 1, wherein the instructions deform the first geodesics and the second geodesics further comprise instructions to:

estimate a first fundamental form of a surface by finite difference methods; and deform the surface by an As Rigid As Possible (ARAP) deformation using the first correspondence and the second correspondence.

10. The system of claim 9, wherein the instructions deform the first geodesics and the second geodesics further comprise instructions to:

determine a similarity between deformed subregions by an estimate of a second fundamental form for each of the subregions; and a comparison of a coefficient between the first fundamental form and the second fundamental form.

11. The system of claim 1, wherein the instructions cause the system to:

extract measurements from the refined stitched point cloud, with an employment of a geodesic distance function.

12. A computer-implemented method of deformable object stitching, comprising:

receiving a first point cloud and a second point cloud having a partial overlap;

finding first prominent features in a subregion $G_1$ and a subregion $G_2$ in a region of the partial overlap;

determining first geodesics based on the first prominent features;

finding second prominent features in a subregion $H_1$ and a subregion $H_2$ in the region of the partial overlap;

determining second geodesics based on the second prominent features;

generating a first correspondence between the subregion $G_1$ and the subregion $H_1$;

generating a second correspondence between the subregion $G_2$ and the subregion $H_2$;

deforming the first geodesics and the second geodesics based on the first correspondence and the second correspondence;

stitching the first point cloud and the second point cloud, thereby generating a stitched point cloud;

calculating a required deformation to transform the first geodesics to the second geodesics;

applying the required deformation to the second point cloud to match the second point cloud to the first point cloud, thereby refining the stitched point cloud; and producing a refined stitched point cloud in a predetermined format.

13. The computer-implemented method of claim 12, wherein finding the first prominent features comprises:

estimating a curvature in the subregion $G_1$ or the subregion $G_2$; then refining the estimated curvature by iteratively calculating the curvature over one or more iterations, such that a region of high curvature is re-calculated by considering a smaller neighborhood in the region of high curvature;

calculating the curvature based on the smaller neighborhood; and repeating the iterations until sampling in a smaller neighborhood does not increase the curvature in the region of high curvature by more than a specified threshold.

14. The computer-implemented method of claim 12, wherein finding the second prominent features comprises:

estimating a curvature in the subregion $H_1$ or the subregion $H_2$; then refining the estimated curvature by iteratively calculating the curvature over one or more iterations, such that a region of high curvature is re-calculated by considering the smaller neighborhood in the region of high curvature;

calculating the curvature based on the smaller neighborhood; and repeating the iterations until sampling in the smaller neighborhood does not increase the curvature in the region of high curvature by more than a specified threshold.

15. The computer-implemented method of claim 12, wherein:

finding the first prominent features comprises approximating a curvature on the subregion $G_1$ and the subregion $G_2$ by:

discretizing a curvature operator; and extracting the first prominent features with respect to the curvature where the curvature is high or zero, a high curvature representing sharp corners and a zero curvature representing a flat region.

16. The computer-implemented method of claim 12, wherein finding the second prominent features comprises:

approximating a curvature on the subregion $H_1$ and the subregion $H_2$ by:
- discretizing a curvature operator; and
- extracting the second prominent features with respect to the curvature where the curvature is high or zero, a high curvature representing sharp corners and a zero curvature representing a flat region.

17. The computer-implemented method of claim 12, wherein computing the first geodesics and computing the second geodesics comprise:
- triangulating on respective subregions; and
- determining a shortest path between two points on a triangulated surface.

18. The computer-implemented method of claim 12, wherein generating the first correspondence and generating the second correspondence comprise:
- ranking the first prominent features and the second prominent features, respectively, by curvature in the first point cloud and the second point cloud, respectively, and
- matching points between the first point cloud and the second point cloud.

19. The computer-implemented method of claim 12, wherein calculating the required deformation comprises:
- producing a first surface determined by connecting any two points between the subregion $G_1$ and the subregion $H_1$;
- producing a geodesic, and
- extending the geodesic into a second surface by considering a neighborhood about the geodesic.

20. The computer-implemented method of claim 12, wherein calculating the required deformation further comprises:
- estimating a first fundamental form of a surface by finite difference methods; and
- deforming the surface by an As Rigid As Possible (ARAP) deformation using the first correspondence and the second correspondence.

21. The computer-implemented method of claim 20, wherein calculating the required deformation further comprises:
- determining a similarity between deformed subregions by:
  - estimating a second fundamental form for each of the subregions; and
  - comparing a coefficient between the first fundamental form and the second fundamental form.

22. The computer-implemented method of claim 12, wherein measurements from the refined stitched point cloud, are extracted with an employment of a geodesic distance function.

23. A non-transitory computer-readable medium comprising a plurality of instructions that are executable on a processor of a system to stitch deformable objects, the instructions comprising instructions to:
- receive a first point cloud and a second point cloud having a partial overlap;
- find first prominent features in a subregion $G_1$ and a subregion $G_2$ in a region of the partial overlap;
- determine first geodesics based on the first prominent features;
- find second prominent features in a subregion $H_1$ and a subregion $H_2$ in the region of the partial overlap;
- determine second geodesics based on the second prominent features;
- generate a first correspondence between the subregion $G_1$ and the subregion $H_1$;
- generate a second correspondence between the subregion $G_2$ and the subregion $H_2$;
- deform the first geodesics and the second geodesics based on the first correspondence and the second correspondence;
- stitch the first point cloud and the second point cloud, thereby generating a stitched point cloud;
- calculate a required deformation to transform the first geodesics to the second geodesics;
- apply the required defamation deformation to the second point cloud to match the second point cloud to the first point cloud, thereby refining the stitched point cloud; and
- produce a refined stitched point cloud in a predetermined format.

24. The non-transitory computer-readable medium of claim 23, wherein the instructions comprise instructions to:
- extract measurements from the refined stitched point cloud with an employment of a geodesic distance function.

* * * * *